(12) United States Patent
Briggs

(10) Patent No.: US 10,723,281 B1
(45) Date of Patent: Jul. 28, 2020

(54) CALIBRATION OF VEHICLE SENSOR ARRAY ALIGNMENT

(71) Applicant: Lyft, Inc., San Francisco, CA (US)

(72) Inventor: Forrest Samuel Briggs, Palo Alto, CA (US)

(73) Assignee: Lyft, Inc., San Francisco, CA (US)

( * ) Notice: Subject to any disclaimer, the term of this patent is extended or adjusted under 35 U.S.C. 154(b) by 0 days.

(21) Appl. No.: 16/361,035

(22) Filed: Mar. 21, 2019

(51) Int. Cl.
*B60R 11/04* (2006.01)
*G01C 21/20* (2006.01)
*G01S 7/497* (2006.01)
*G05D 1/02* (2020.01)

(52) U.S. Cl.
CPC .............. *B60R 11/04* (2013.01); *G01C 21/20* (2013.01); *G01S 7/497* (2013.01); *G05D 1/0234* (2013.01); *G06T 2207/30244* (2013.01)

(58) Field of Classification Search
CPC .............. G06K 9/00805; G06K 9/6288; G06T 2207/10028; G06T 2207/20008; G06T 2207/30252; G06T 7/73; G06T 7/80; G06T 7/85
See application file for complete search history.

(56) References Cited

U.S. PATENT DOCUMENTS

| 10,171,802 | B2 * | 1/2019 | Tanaka | B60R 1/00 |
| 2009/0299684 | A1 * | 12/2009 | Imanishi | G06T 7/80 |
| | | | | 702/150 |
| 2014/0036076 | A1 * | 2/2014 | Nerayoff | G06K 9/00791 |
| | | | | 348/148 |
| 2016/0173740 | A1 * | 6/2016 | Corby | F16M 13/027 |
| | | | | 348/144 |
| 2017/0124864 | A1 * | 5/2017 | Popple | B60W 10/20 |
| 2019/0196499 | A1 * | 6/2019 | Paden | G06T 7/70 |

* cited by examiner

*Primary Examiner* — Jessica M Prince
(74) *Attorney, Agent, or Firm* — Baker Botts L.L.P.

(57) ABSTRACT

In one embodiment, a method includes detecting multiple reference markers on a vehicle and multiple reference markers on a sensor array attached to the vehicle. The method includes determining a pose of the vehicle and a pose of the sensor array based on the detected reference markers on the vehicle and sensor array and a model of the vehicle and sensor array that includes expected locations of the detected reference markers on the vehicle and sensor array. The method includes computing an observed relative orientation between the sensor array and the vehicle based on a comparison of the determined pose of the sensor array and vehicle. The method includes determining a calibration factor for a sensor of the sensor array based on a comparison of the observed relative orientation between the sensor array and the vehicle to an expected relative orientation between the sensor array and the vehicle.

20 Claims, 11 Drawing Sheets

CALIBRATION OF VEHICLE SENSOR ARRAY ALIGNMENT

BACKGROUND

Many vehicles come equipped with arrays of sensors that provide numerous benefits to the user. Navigational sensors, vision sensors, even weather sensor may all be used to augment human ability or provide autonomous driving functionality. In all scenarios, and especially when measurements taken by sensors are used to control a vehicle, proper calibration of these sensors is essential. Calibration may include internal calibration of each sensor such as ensuring that measurements match experienced phenomena and physical calibration of one or more sensors relative to each other. Systems of the vehicle may use information about the physical position and rotation of sensors relative to each other to interpret and use the data.

Calibration of sensors can often be performed based on a manufacturing specification for the vehicle and integration of the sensors with the vehicle. However, manufacturing and assembly will not always match the specification perfectly. Furthermore, use of the vehicle and the sensors may render calibration used with sensors out of date. Techniques are therefore needed to performed calibration of sensors after manufacture and assembly of a vehicle have been completed. Many existing techniques required large time commitments, take the vehicle out of service, and produce inconsistent results, requiring many additional stages of confirmation and recalibration to correct for error unintentionally introduced by the calibration techniques. This can be particularly costly to vehicle owners and operators.

DESCRIPTION OF EXAMPLE EMBODIMENTS

Figure 1:
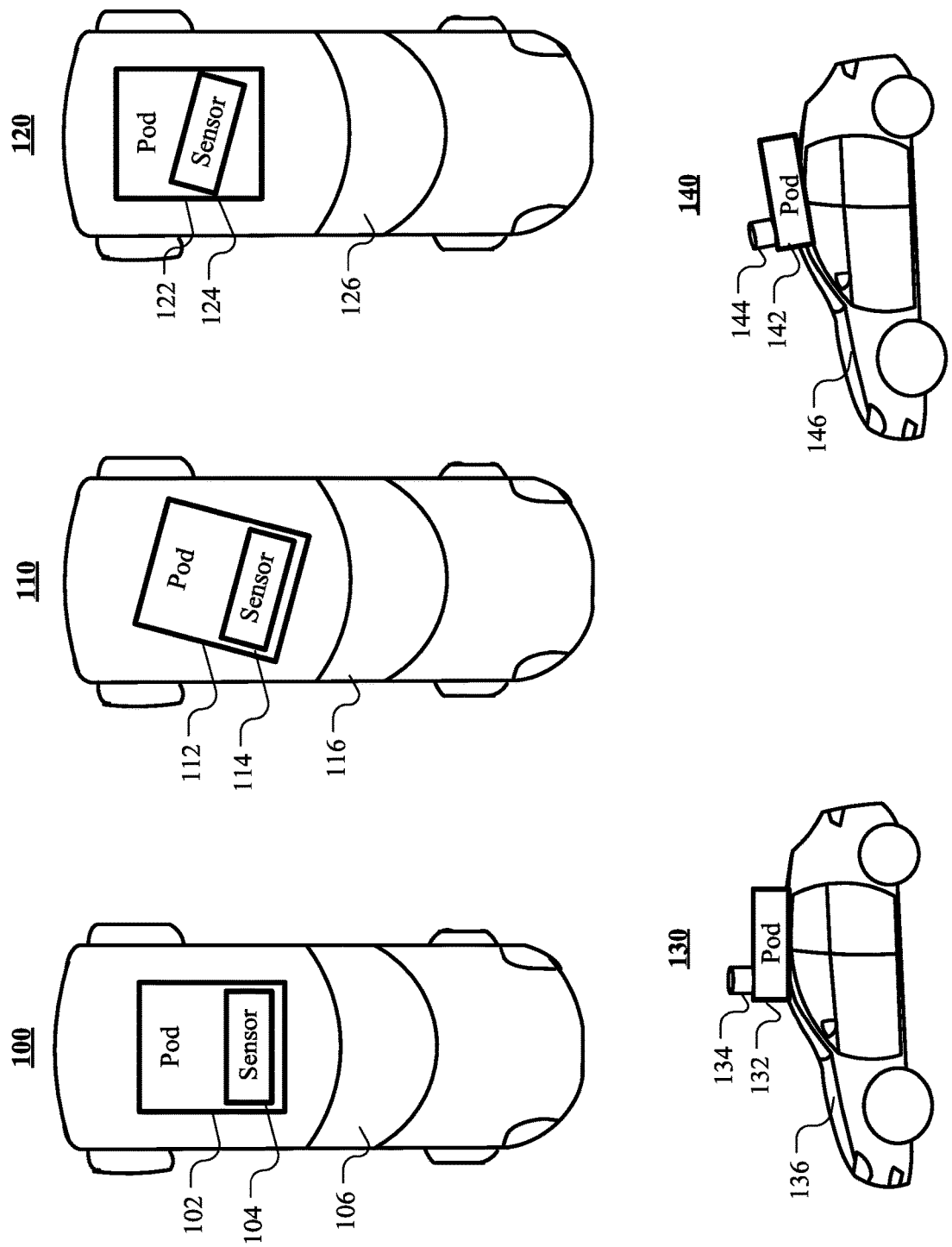
FIG. 1 illustrates examples of sensor and sensor array misalignments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. In addition, the embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

Many vehicles are equipped with arrays of sensors that provide numerous benefits to the user. In some cases, the sensors augment human ability, such as cameras to assist with reversing or parking the vehicle, lane-guidance detectors, or navigational sensors. In some cases, the sensors are used by partially to fully autonomous vehicles. For example, lidar detectors, radar detectors, and cameras may be used to allow the vehicle to build and locate itself within a model of the environment surrounding it. Navigational sensors, such as global position system receivers or altimeters, allow a computing device of the vehicle to provide larger-scale routing instructions. Inertial measurement units ("IMUs") (including accelerometers and gyroscopes) may provide direct feedback to vehicle control and emergency detection systems. Weather sensors, such as thermometers, barometers, or anemometers may help the other sensors to compensate for inclement weather. All these sensors may be included, for example, in human-driven automobiles to enhance the driving experience and help ensure safety of drivers, passengers, and pedestrians. In all scenarios, and especially when measurements taken by sensors are used to control the vehicle, proper calibration of these sensors is essential. Calibration may include internal calibration of each sensor (e.g., ensuring that an inertial measurement unit output matches the actual experienced effects) and physical calibration of one or more sensors relative to each other. A computing device of the vehicle may use information about the physical position and rotation of the sensors relative to each other to interpret the data, for example to account for delays between data received from certain sensors, and to build a complete, and accurate picture of the environment surrounding the vehicle.

In some embodiments, one or more sensors may be included together into a single housing to minimize the need for physical calibration between the sensors included in the housing. For example, an IMU, lidar detector, camera, and inertial navigational system, may all be included in a single sensor array (or "roof pod") so that when the sensor array is installed, the only significant physical calibration step is to account for the rotation and position of the roof pod itself. For the purposes of this disclosure, unless specifically indicated, the terms sensor array and roof pod may be used interchangeably. A vehicle manufacturer may provide a manufacturing specification (e.g., a computer-aided design model) that sets out requirements for the orientation, including both the position and rotation, of the sensor array. The manufacturer may then determine the necessary calibration factors based on the specified orientation of the sensor array to the vehicle. The remaining calibration factors to account for orientation variations among the sensors can be specified based on the calibration factors to account for roof pod orientation variation.

However, even under ideal conditions, vehicle manufacturing is not always performed exactly to specification and variation often exists between the model and physical vehicles. Many sensors that may be included in a sensor array roof pod are high-precision instruments and even minute differences in orientation could potentially cause a computing system of the vehicle to improperly interpret signals. This may result in issues ranging from poor vehicle or navigational performance to life-threatening wild driving or accidents.

Examples and embodiments throughout this disclosure refer to vehicles in the form of human-driven or autonomous automobiles. However, the techniques described herein are not, and should not be understood to be, restricted to vehicles in the form of a conventional automobile. The techniques and systems discussed herein may be applied to any vehicle to which a sensor array requiring calibration may be attached. Therefore, where this disclosure uses the term vehicle, it should be understood to refer to any suitable transportation vehicle including, but not limited to, bicycles, scooters, motorcycles, automobiles, busses, trucks, trains, trolleys, all-terrain vehicles, aircraft, drones, watercraft, amphibious vehicles, and any other suitable transportation vehicles, whether human operated, remote operated, or autonomous.

As illustrated in FIG. 1, the range of roof pod to vehicle, or sensor to roof pod (or vehicle), configurations includes deviations from a specified position or rotation of the roof pod (or sensor). FIG. 1 includes several vehicle configurations 100, 110, 120, 130, and 140. Configurations 100, 110, and 120 include example top-down views of a vehicle, roof pod (including a sensor array), and sensor. Configurations 130 and 140 include example profile views. Configuration 100 shows a vehicle 106, roof pod 102, and sensor 104 in proper alignment. Configuration 110 shows a vehicle 116 onto which a roof pod 112 has been improperly mounted. Specifically, the rotation of the roof pod 112 relative to the vehicle 116 deviates from the specified rotation (as shown in configuration 100). The sensor 114 is mounted properly within the roof pod 112, but this has the effect of causing the sensor 114 to be improperly mounted relative to the vehicle 116. Configuration 120 shows a vehicle 126 onto which a roof pod 122 has been improperly mounted. Specifically, the position of the roof pod 122 relative to the vehicle 126 is incorrect—the roof pod 122 has been mounted further back from the center of the wheel base of the vehicle 126 than specified (as shown in configuration 100). This also causes the position of the sensor 124 to deviate from the specified position. Additionally, the sensor 124 of the roof pod 122 is improperly mounted—the rotation of the sensor 124 relative to the vehicle 126 and roof pod 122 deviates from the specified rotation (as in configuration 100). Configuration 130 shows a vehicle 136, roof pod 132, and sensor 134 in proper alignment. Configuration 140 shows a vehicle 146 onto which a roof pod 142 has been improperly mounted. Specifically, the roof pod 142 has been mounted such that its pitch relative to vehicle 146 is incorrect. This has the effect of also causing a tilt in the mounting of the sensor 144.

As can be seen by the configurations demonstrated in FIG. 1, there are a variety of possible mounting issues that affect the orientation of a sensor array (and included sensors) to a vehicle. This may include the position of the sensor array relative to the vehicle. The position may include the mounting when considering the vehicle and sensor array a three-dimensional axis. The sensor array may be mounted too high or low relative to the vehicle (e.g., along the z-axis). The sensor array may be mounted too far to the driver's side or passenger side (left or right of the specified location when viewed from the top (e.g., along the x-axis)). The sensor array may also be mounted too close to the front or rear of the vehicle (e.g., along the y-axis when viewed from the top). The sensor array may be mounted too high or too low (e.g., along the z-axis). Individual sensors may be affected by this improper mounting and may have their own positional mounting errors. The rotation of the sensor array may also be improper. The rotation may include the pitch, roll, or yaw of the sensor array relative to the vehicle. For the purposes of this disclosure, the term "orientation" of an object may be used to refer to the position or rotation of an object relative to another object or some other reference point. The "pose" of the object may be used to refer to the position or rotation of the object on its own.

Because of the wide variety of potential mounting errors, and the high likelihood that these errors will cause a computing system associated with the vehicle to misinterpret data output by sensors of a sensor array, it is essential that calibration be performed. Certain calibration techniques exist, but often they rely on assumptions that may or may not be accurate. Calibration may be performed in a manufacturing (or post-manufacturing, but pre-delivery) environment. However, calibration at this time assumes that the manufacturing process will be accurate and that the sensor array, sensors, and vehicle will remain unchanged before the vehicle is used. Other calibration techniques are slow and cumbersome, requiring precise measurements of the relative orientation of the sensors and sensor array to the vehicle. Precise measurement to the degree required for high-precision vehicle sensors are work- and time-consuming and may require that vehicle be taken out of use for an extensive period of time. It is therefore desirable for quick and effective techniques to provide calibration factors for the output of sensors, so that a computing system of a vehicle may rely on accurate sensor data.

In particular embodiments, a sensor array attached to a vehicle may be calibrated using data received from a satellite guidance or positioning system such as an inertial navigation system (INS) or global national satellite system (GNSS). The sensor array may include a sensor such as an IMU that includes an accelerometer and/or gyroscope. The accelerometer may detect and output the instantaneous linear acceleration experienced by the IMU (and sensor array). Similarly, the gyroscope may detect and output measurements of rotational acceleration. The output of the accelerometer may include both a direction of acceleration and the magnitude, and thus may be interpreted as a vector. Because the accelerometer outputs the direction of acceleration forces experienced by the accelerometer, the direction of travel of the accelerometer may be calculated by rotating the accelerator vector by 180 degrees.

In particular embodiments, a vehicle may also include a receiver, and other necessary components, to allow the sensor array of the vehicle to communicate with a guidance system. A guidance system may output the position of the vehicle at a requested point in time. However, because the guidance system relies on communication with external devices (such as GNSS satellites), the guidance system may not be capable of outputting direction of travel of a vehicle directly. The direction of travel may be calculated by comparing measurements of the position of the vehicle over time. For example, a vehicle may move from a position $p_1$ to another position $p_2$. A guidance system may provide the precise position $p_1$ of a vehicle at time $t_1$ and the precise position $p_2$ of the vehicle at a later time $t_2$. The velocity of the vehicle may be calculated according to the formula:

$$v = \frac{p_2 - p_1}{t_2 - t_1}$$

Velocity calculated in this manner (based on observation and not internal sensors) may be referred to as a thrust vector of the vehicle. The thrust vector of a vehicle refers to the direction the vehicle will travel if the throttle is engaged (e.g., the direction the wheels of the vehicle are pointing).

In particular embodiments, to calibrate the orientation of a sensor array attached to the vehicle, a computing system of the vehicle may compare the output of an accelerometer of an IMU at a particular time to the thrust vector of the vehicle at the same time. For example, the vehicle may be stationary at time $t_1$ and the position $p_1$ may be measured by the INS. The vehicle may then travel to position $p_2$ as recorded by the INS during its next measurement interval (e.g., several milliseconds later). The positions and times output by the INS receiver of the vehicle sensor array may be transmitted to a computing system associated with the vehicle. As the vehicle was at rest, to travel to the point $p_2$ the vehicle must have undergone some form of acceleration between the time $t_1$ and the time $t_2$. Therefore, the output of an accelerometer of an IMU of the sensor array during the time between $t_1$ and $t_2$ may also be transmitted to the computing system. The computing system may calculate the thrust vector of the vehicle v during that time using the above formula. The computing system may compare the direction of the thrust vector, $\theta_v$, to the direction of the acceleration, $\theta_a$. If the sensor array and IMU are mounted correctly, there should be no difference between $\theta_v$ and $\theta_a$. That is, $\theta_v - \theta_a = 0$. If, however, a difference exists, it is likely that the sensor array or IMU are not mounted correctly.

In particular embodiments, due to its low computational cost, the dot product of the acceleration and thrust vector of the vehicle may be used to calculate a difference between the thrust vector and acceleration. In general, the difference $\theta$ between the acceleration a and the thrust vector v may be calculated by:

$$\theta = \cos^{-1}\left(\frac{v \cdot a}{\|v\|\|a\|}\right)$$

This calculated difference may represent a difference in rotation between the IMU (and implicitly, the sensor array) and the vehicle because the thrust vector of the vehicle should correspond to the acceleration measured by the IMU. Thus, a calibration factor may be derived from $\theta$ to account for the difference. In this case, the calibration factor may be an angular offset to be applied to measurements from the IMU and other sensors of the sensor array.

Figure 2:
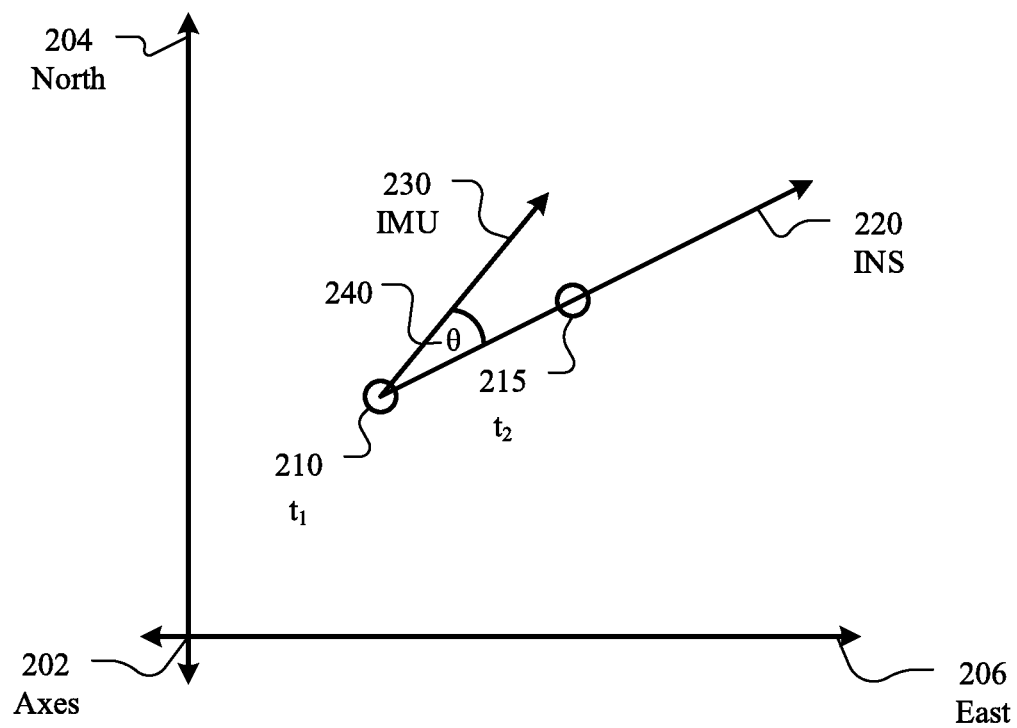
FIG. 2 illustrates an example technique for sensor array alignment to vehicle thrust vector alignment calibration.

FIG. 2 illustrates the calculation described above. FIG. 2 includes two-dimensional axis 202 that corresponds to due north 204 and due east 206. The axis 202 are labelled as such for illustration only and is not meant to limit the application of the described techniques. Marked on the axis 202 are the position 210 of a vehicle at time $t_1$ and the position 215 of the vehicle at time $t_2$. As described above, the positions may be measured by a satellite guidance system, such as an INS- or GNSS-compatible navigation system, referred to as the INS for the sake of simplicity here. Example INS may determine the position of the vehicle accurate to within 1 m, or less. Particular INS may determine the position of the vehicle to within 10 cm. The INS may periodically determine the position of the vehicle, for example every 100 ms, 10 ms, or more frequently.

A computing system associated with the vehicle may receive the positions 210 and 215 of the vehicle, and the corresponding times, and may calculate a vector 220 corresponding to the thrust vector of the vehicle as measured by the INS. At the same time, the computing system may receive a vector 230 corresponding to the acceleration of the vehicle (the computing system may also rotate the vector 230 as described above). The computing system may calculate an angular difference 240 between the received velocity vector 220 and the received acceleration vector 230. From this angular difference, the computing system may determine a relative orientation between the IMU and other sensors of the sensor array and the body of the vehicle. The computing system may determine one or more calibration factors for the sensors of the sensor array attached to the vehicle based on the determined relative orientation, treating the calculated difference 240 as an indicator that that sensor array is mounted improperly with respect to the vehicle. In particular embodiments, the calibration factors may correct the yaw of the sensor array relative to the thrust vector of the vehicle.

Figure 3:
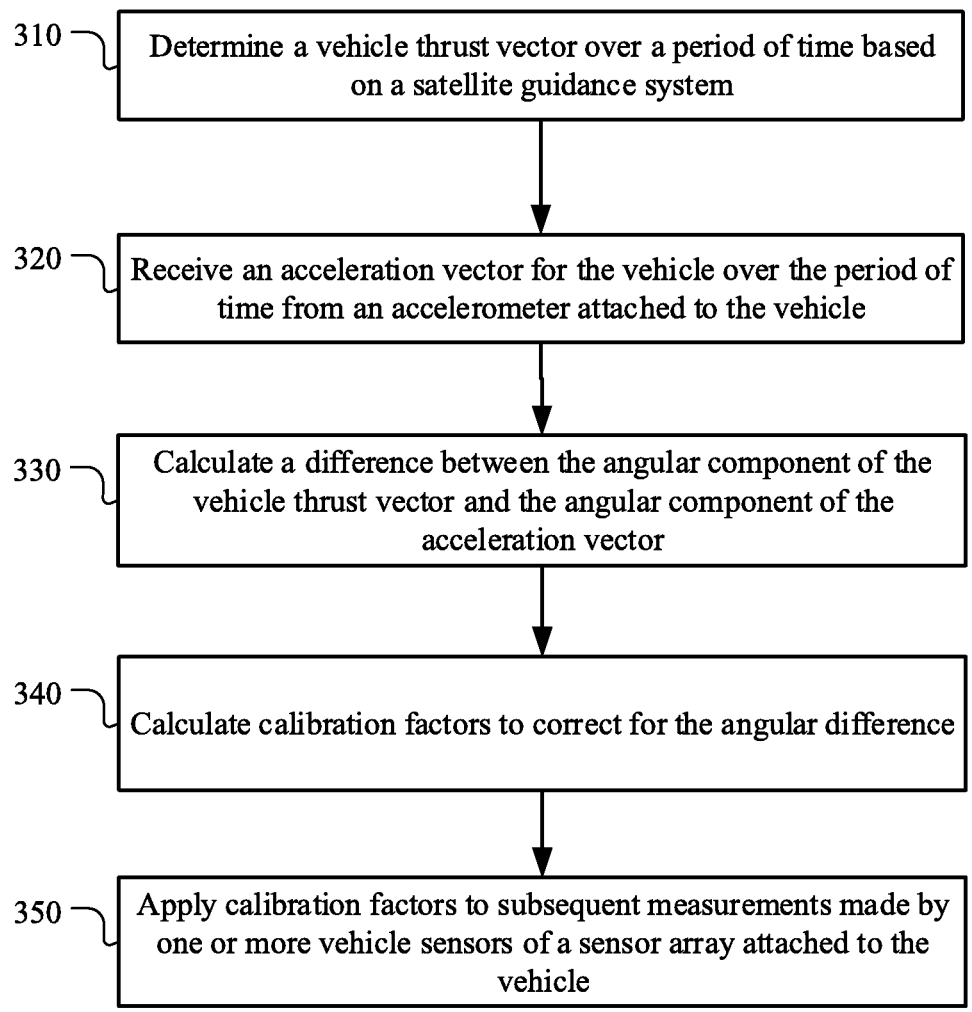
FIG. 3 illustrates an example of a method for sensor array to vehicle thrust vector alignment calibration.

FIG. 3 illustrates an example method 300 for sensor array to vehicle thrust vector alignment calibration. The method may begin at step 310, where a computing system associated with a vehicle may determine a vehicle thrust vector over a period of time based on output received from a satellite guidance system. As described above, the satellite may be, for example, a GNSS- or INS-compatible system. The computing system may be a computing system of the vehicle or may be a computing system in communication with the vehicle. The computing system may determine the vehicle thrust vector by comparing the position of the vehicle at a plurality of times. At step 320, a computing system may receive an acceleration vector for the vehicle over the period of time from an accelerometer attached to the vehicle. The accelerometer may be a component of an IMU attached to the vehicle or attached to a sensor array that is attached to the vehicle. In particular embodiments, the received acceleration vector may be averaged or may be an instantaneous acceleration at a point in time during the period of time.

At step 330, a computing system may calculate a difference between the angular component of the vehicle thrust vector and the angular component of the acceleration vector. In particular embodiments, the calculation may be performed using a dot product between the thrust vector and acceleration vector. By calculating the difference between the thrust vector and the acceleration vector, the computing system may determine that one or more misalignments or miscalibrations have occurred between the vehicle and one or more sensors of the vehicle. The computing system may therefore determine to calculate one or more calibration factors correcting the misalignment or miscalibration. At step 340, a computing system may calculate calibration factors sufficient to correct for the angular difference. The angular difference may also be treated as symptomatic, and, additionally or alternatively, other types of calibration factors may be calculated. At step 350, a computing system may apply the calculated calibration factors to subsequent measurements made by one or more vehicle sensors of a sensor array attached to the vehicle. In particular embodiments, the vehicle sensors may comprise an IMU, GNSS or INS receiver, a lidar detector, a camera, or any other suitable type of sensor. The calculated calibration factors may comprise value offsets or corrections to correct for misalignment between the vehicle sensor and the sensor, the vehicle sensor and the vehicle, or the sensor array and the vehicle, as determined required by the computing system.

Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates an example method for sensor array to vehicle thrust vector alignment calibration including the particular steps of the method of FIG. 3, this disclosure contemplates any suitable method for sensor array to vehicle thrust vector alignment calibration including any suitable steps, which may include all, some, or none of the steps of the method of FIG. 3, where appropriate. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

In particular embodiments, it may be desirable to calculate the orientation of the sensor array relative to the vehicle body to which it is attached, rather than the vehicle thrust vector. This may be advantageous, as it may permit a computing system of the vehicle, or a user supervising the calibration, to precisely determine the nature of the improper mounting. For example, using a method to calibrate the sensor array to the vehicle thrust vector, errors that are interpreted as being derived from orientation variation may actually result from an error in the IMU (internal or mounting) or the satellite guidance system. It may be further desired for the calibration procedure to be performable without requiring vehicle motion or using data from devices not included on the vehicle, such as in a calibration facility).

In particular embodiments, calibration of a vehicle and a sensor array attached to the vehicle may be performed using one or more cameras and an internally self-consistent model of the vehicle. The vehicle and sensor array may each have one or more camera-detectable reference markers attached, the position of which are specified within the model. A computing system may determine the pose of the vehicle and the sensor array based on detected locations of the reference markers and the self-consistent model. The computing system may determine the observed relative orientation between the sensor array and the vehicle by reference to the expected positions of the reference markers. The computing system may compare the observed relative orientation of the sensor array and the vehicle to the expected relative orientation of the sensor array and the vehicle as specified by the model of the vehicle and sensor array. The computing system may determine whether the observed orientation deviates from the expected orientation and may calculate one or more calibration factors for one or more vehicle sensors within the sensor array. It will be appreciated that although this disclosure describes using the following techniques to calibrate a vehicle and a sensor array attached to the vehicle, the techniques could be used to detect misalignment of, and if necessary calibrate, any reasonable components of a vehicle.

Figure 4:
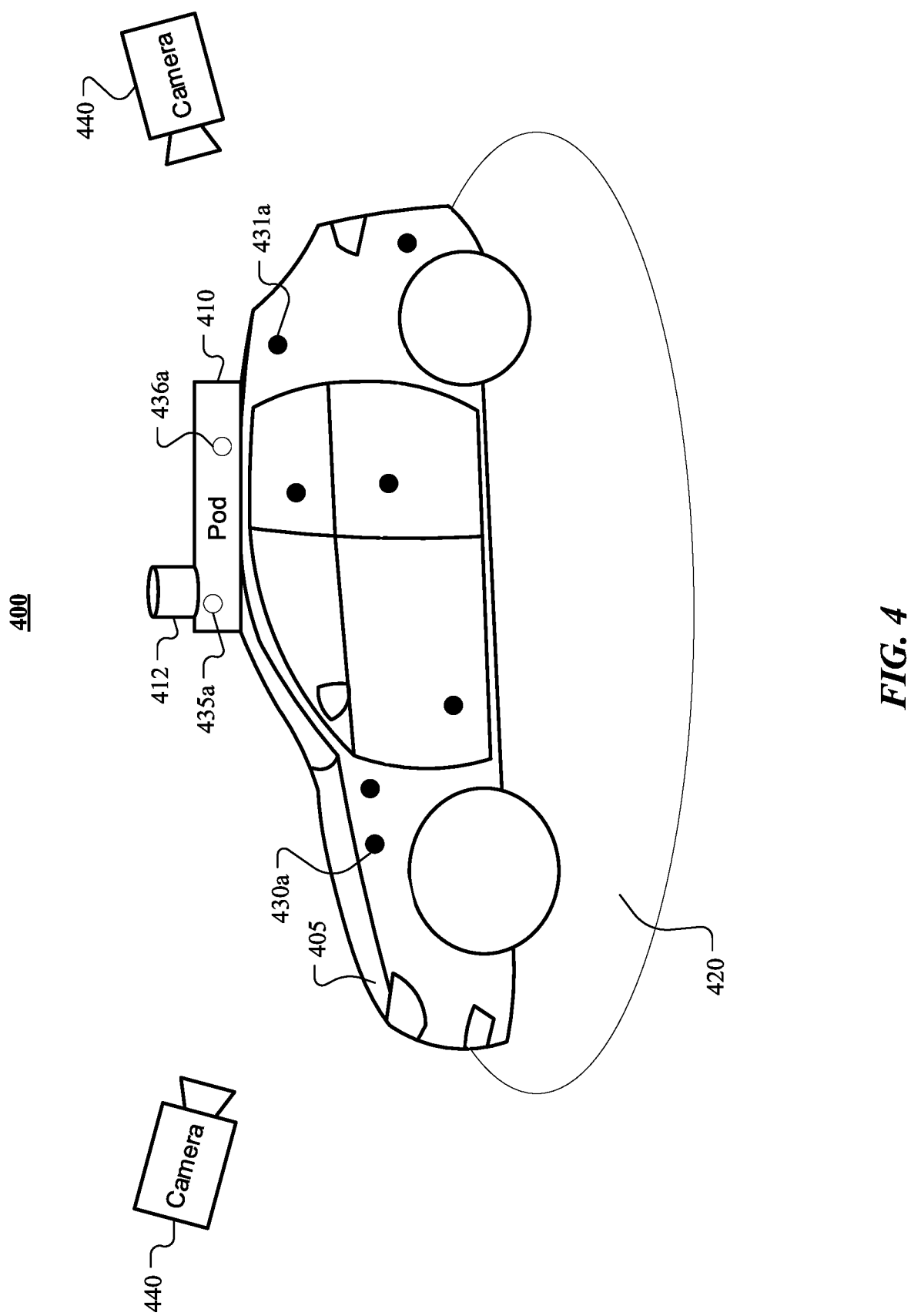
FIG. 4 illustrates an example technique for sensor array alignment calibration.

FIG. 4 illustrates an example configuration 400 of a calibration facility to calibrate the orientation of a sensor array 410 and a vehicle 405 to which the sensor array 410 is attached. The sensor array 410 may include one or more vehicle sensors 412. For example, the vehicle sensors may include one or more lidar detectors, cameras, radar detectors, IMUs, INS- or GNSS-compatible systems, or any other suitable vehicle sensors.

Included on both the vehicle 405 and the sensor array 410 are a plurality of reference markers 430a, 431a, 435a, and 436a. In particular, reference markers 430a and 431a are located on the vehicle 405. Reference markers 435a and 436a are located on the sensor array 410. The reference markers are illustrated as dots, but may be in the form of a wide variety of suitable shapes. For example, the reference markers may include one or more retroreflective patches (e.g., be composed of material that reflects light back to the emitting source), fiducial markers (e.g., two-dimensional bar codes, including but not limited to QR codes), light-emitting diodes, or specific marks or sections of the vehicle body 405 or sensor array 410.

In particular embodiments, as illustrated in FIG. 4, the reference markers 430a and 431a on the vehicle 405 may be differentiated from the reference markers 435a and 436a on the sensor array 410. For example, in the case of retroreflective patches, the patches may be different shapes or configured to reflect different colors. In the case of fiducial markers, the markers may identify the object to which it is attached. In the case of light-emitting diodes, the diodes may have differing orientations or emit different colors or light intensities. In general, the reference markers may have different color, shape, size, or material properties as appropriate based on the type of reference marker used to assist with determining whether a particular reference marker is attached to the vehicle body 405 or to the sensor array 410.

The calibration facility 400 illustrated by FIG. 4 includes two cameras 440. The cameras 440 may be configured to capture images comprising the vehicle 405, sensor array 410, or both. Although two cameras 440 are shown, this is for illustrative purposes only, as any suitable number of cameras 440 may be used. For example, a single camera 440 may be used and, if multiple camera angles are desired, the camera 440 may be moved, or the vehicle 405 may be rotated (e.g., by a car-turner 420). In particular embodiments, the cameras 440 may be equipped with a light source depending on the type of reference marker 430a, 431a, 435a, and 436a used. For example, the camera 440 may include a light source (e.g., visible or infrared), so that the vehicle 405 and sensor array 410 will be illuminated and easier to detect in captured images (as may be especially desirable in the case of retroreflective patches or fiducial markers). The cameras 440 may comprise one or more filters to modify light approaching the camera 440, increasing the visibility of the reference markers. In particular embodiments, the reference markers 430a, 431a, 435a, and 436a may be projected onto the vehicle and/or sensor array by a light projection system used by a calibration system. For example, a laser or other light projector may be configured to project a specified arrangement (e.g., grid) of points onto the vehicle 405 and sensor array 410. The projected points may be interpreted as reference markers.

Figure 5:
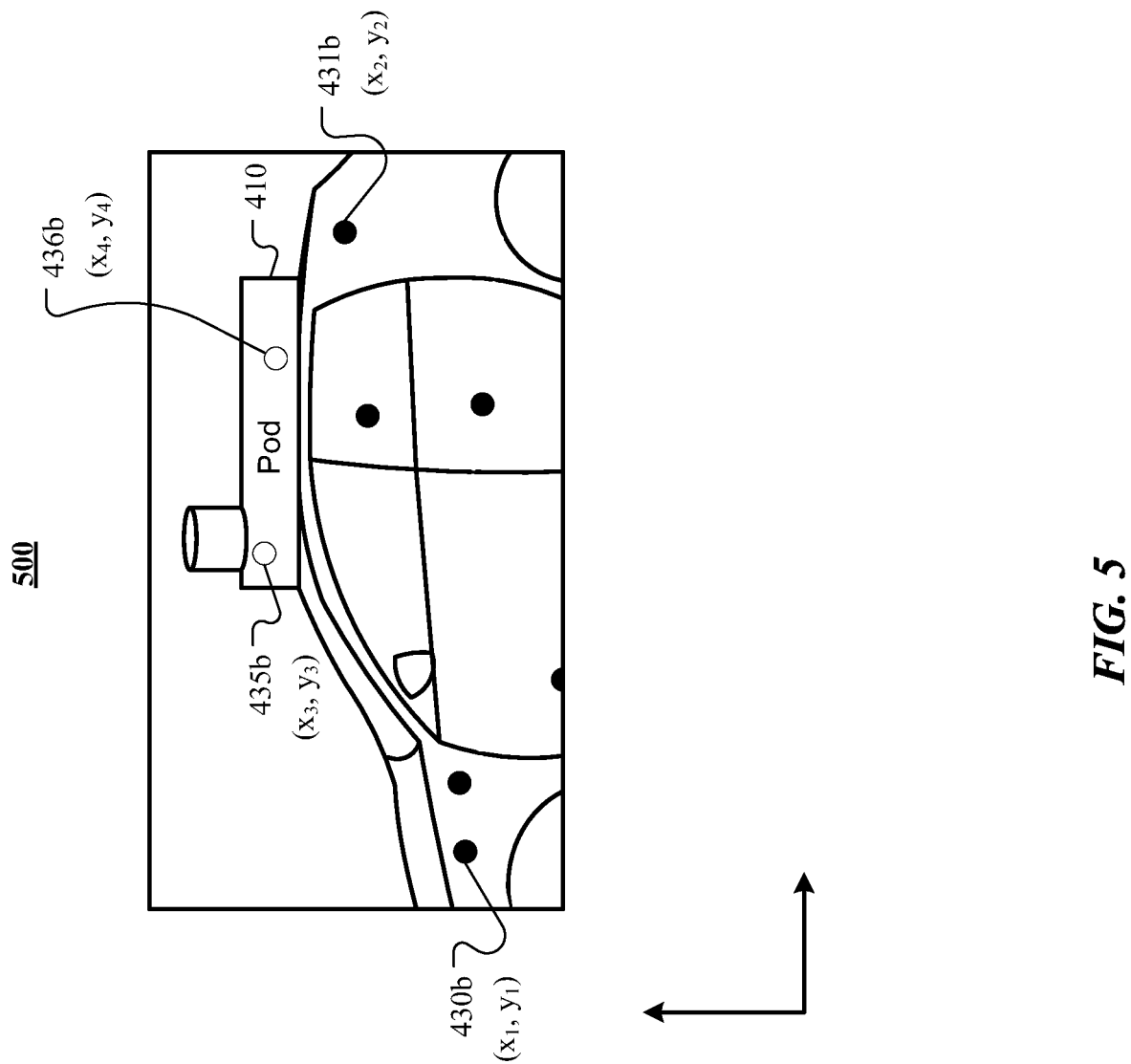
FIG. 5 illustrates an example image used in sensor array alignment calibration.

A camera 440 may detect the reference markers 430a, 431a attached to the vehicle 405 and may detect the reference markers 435a and 436a attached to the sensor array 410. For example, the camera 440 may capture an image comprising the vehicle 405 and sensor array 410. In some embodiments, the camera 440 may be used while the vehicle is in motion, capturing images used by the calibration system while the vehicle 405 is still in use. In particular embodiments, a camera 440 may be attached to the vehicle 405 or to the sensor array 410. An example image 500 captured by a camera 440 is shown in FIG. 5. The image 500 includes a portion of the vehicle 405 and sensor array 410. The captured portion includes a plurality of reference markers, including reference markers 430b and 431b on the vehicle 405 and reference markers 435b and 436b on the sensor array 410.

A computing system of a calibration system may determine likely locations of reference markers within the image. Depending on the type of reference marker, the computing system may use one or more known image-recognition techniques to identify the location of one or more pixels of the image comprising the reference markers. In particular embodiments, the computing system may identify points in the image with a high brightness or color intensity corresponding to a brightness or color intensity designated for a reference marker. The computing system may identify patterns (e.g., 2D barcodes) corresponding to fiducial markers. The computing system may perform other analyses of the image to identify designated points of interest on the vehicle 405 and/or sensor array 410. For example, the computing system may identify corners of the sensor array 410 or particular vehicle sensors of the sensor array, transition points on the vehicle 405 (e.g., where the glass of a window meets the rest of the vehicle body), or particular parts of the vehicle (e.g., wheels, mirror, or light fixtures).

After identifying the pixel locations of interest, the computing system may associate those pixel locations with particular reference markers. In particular embodiments, this may require disambiguation. For example, the computing system may use known information (e.g., shape, color, etc.) about differentiation information for reference markers designated for the vehicle 405 and reference markers designated for the sensor array 410. The computing system may further disambiguate individual reference markers. For example, using clustering and pattern recognition, the computing system may determine that the pixel location of marker 430b, $(x_1, y_1)$, corresponds to reference marker 430a shown in FIG. 4. In particular embodiments, the reference markers may each be unique (e.g., unique fiducial markers for each) and associating the reference marker to a pixel location may merely require identifying the unique marker. These processes may be performed for all or a subset of the reference markers captured within the image, such that each pixel location of interest is associated with a reference marker.

The computing system may then determine a pose of the vehicle and sensor array. In particular embodiments the pose of the vehicle may be determined based on the pixel locations associated with each reference marker captured in an image and a self-consistent model of the vehicle comprising an expected location of each reference marker. As discussed below, different approaches may be used to determine the pose of the vehicle and the pose of the sensor array. In one example approach, multiple images may be used to estimate an observed three-dimensional location for the reference markers. The three-dimensional location may be compared to corresponding locations in the model. In another example approach, a single image may be used, with the reference marker locations matched to corresponding reference marker locations as specified in the model. Using the correspondences, the location of the camera relative to the vehicle (or the vehicle relative to the camera) may be determined. Similar processes may be used to determine the pose of the sensor array attached to the vehicle.

Figure 6:
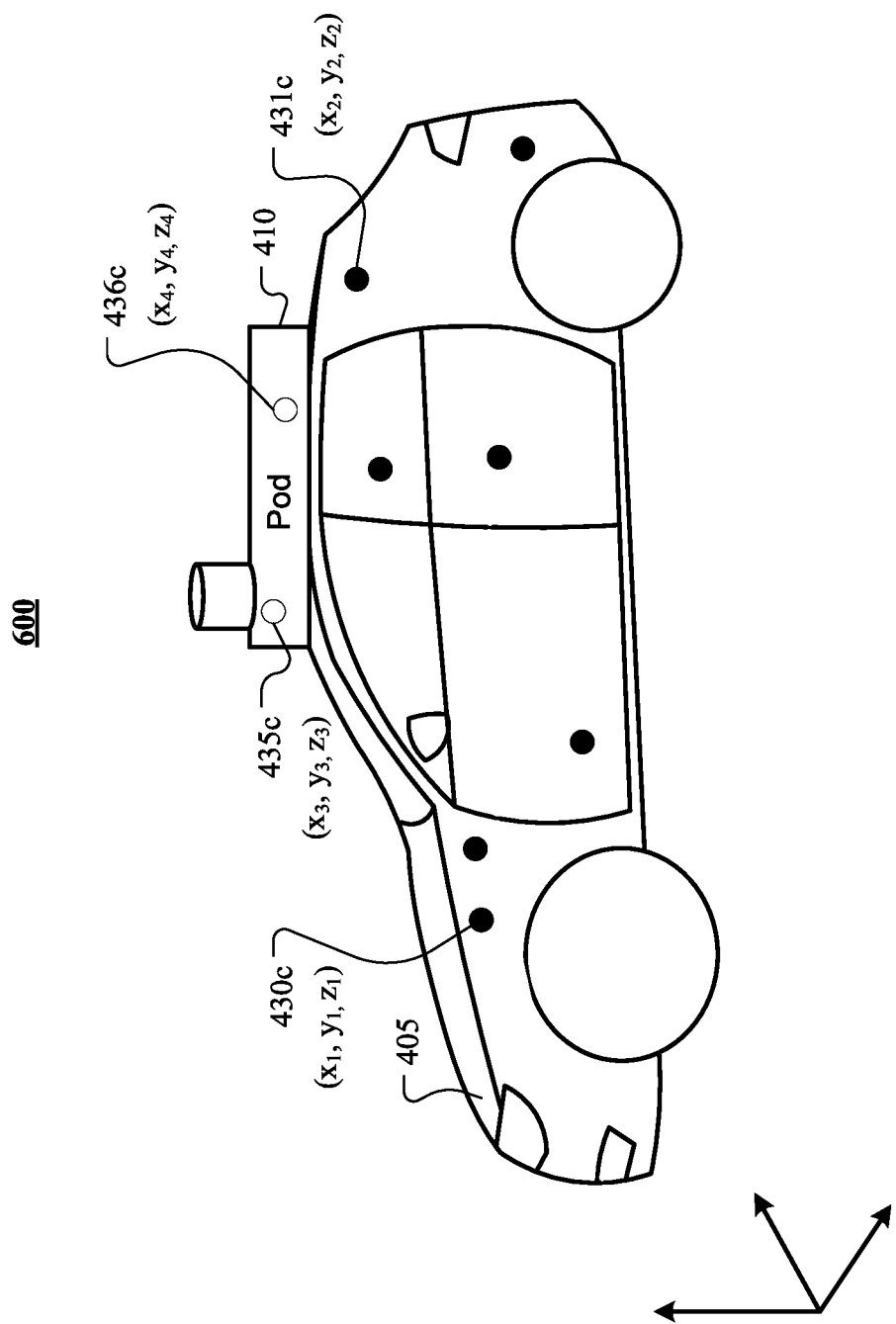
FIG. 6 illustrates an example model used in sensor array alignment calibration.

FIG. 6 illustrates an example self-consistent model 600. The model 600 comprises an expected location of each reference marker 430c, 431c, 435c, and 436c (corresponding to reference marker 431a, 431b, 435c, and 436c, respectively). The respective location may be expressed in terms of a three-dimensional world-oriented coordinate system. For example, the model 600 indicates that the expected location of reference marker 430c is $(x_1, y_1, z_1)$, the expected location of reference maker 431c is $(x_2, y_2, z_2)$, the expected location of reference maker 435c is $(x_3, y_3, z_3)$, and the expected location of reference maker 436c is $(x_4, y_4, z_4)$.

To determine the pose of the vehicle 405, the computing system may compare the arrangement of the reference markers on the vehicle 405 (e.g., 430a and 431a), as captured in the image 500 (e.g., 430b and 431b) to the arrangement of the corresponding expected locations of the reference markers (e.g., 430c and 431c) as expressed in the model 600. For example, the computing system may determine a pattern formed by the reference markers (e.g., 430a and 431a) on the vehicle 405. The computing system may extract that pattern and attempt to map the pattern to the expected locations of the reference markers (e.g. 430c and 431c) in the model 600. By mapping the pattern, the computing system may be able to determine an orientation of a camera 440 that imaged the vehicle 405 relative to the vehicle 405. Optionally, the computing system may determine an orientation of the vehicle 405 relative to the camera 440. In particular embodiments, the pattern matching may use approximations of the expected locations of the reference markers to account for reference markers that were not placed correctly during vehicle manufacture. In particular embodiments, each reference marker may comprise an identifying feature, such as a particular color or identifying code (e.g., a 2D barcode). In this case, no pattern matching may be required, as the correspondence between a particular imaged reference marker (e.g., 430b and 431b) and an expected location (e.g., 430c and 431c) can be determined.

In particular embodiments, the pose of the vehicle 405 may be determined based on pixel locations associated with each reference marker (e.g., 430a and 431a) with respect to multiple images 500. The vehicle 405 may be imaged multiple times, from multiple different points of view. This image 500 may be captured by multiple cameras 440 or by a single camera 440 at different locations. After associating each pixel location of interest (e.g., 430b and 431b) within each image with a reference marker (e.g., 430a and 431a, respectively), the computing system may identify correspondences between each image. For example, the computing system, having identified a pixel location for reference marker 430a in two images, may associate each pixel location with that reference marker 430a, and associate the pixel locations across images. The computing system may do this for each identified pixel location. Having generated point-to-point correspondences across multiple images, the computing system may estimate a three-dimensional location (e.g., a position in a world coordinate system, object coordinate system, or camera coordinate system) for the reference marker associated with each identified point. In particular embodiments, increasing the number of images and reference markers used increases the accuracy of the estimated position and the speed of arriving at the estimation. Using a calibrated camera (e.g., wherein the camera intrinsic parameters and location are known), the computing system may determine a three-dimensional location of each reference marker in a world-oriented coordinate system. Using the camera calibration information, the computing system may express the location of each reference marker in a coordinate system corresponding to one or more of the cameras 440 that imaged the vehicle 405. Using a similar approach to that described for the vehicle 405, the pose of the sensor array 410 may be determined.

The pose of the vehicle and sensor array may each be expressed in a variety of manners. The pose (including the position and rotation) may be specified in a world coordinate system. For example, the computing system may assign an arbitrary point of origin for the coordinate system and may specify a rotation and translation necessary to place a point of origin or center of mass of the vehicle 405 and of the sensor array 410 relative to the arbitrary point of origin. The pose may alternatively or additionally be specified relative to the position and location of the camera 440 that captured the image 500 of the vehicle 405 and sensor array 410. For example, using the camera as the origin of a coordinate system, the pose of the vehicle 405 and sensor array 410 may be expressed as a rotation and/or a translation required to place the vehicle 405 and sensor array 410 in the appropriate position and rotation in view of the camera 440. As another example, using the vehicle 405 or sensor array 410 as the origin of a coordinate system (e.g., a center of mass or point of origin for the vehicle 405 or sensor array 410), the pose of the vehicle 405 and sensor array 410 may be expressed as a rotation and/or translation needed to place the camera around the vehicle 405 or sensor array 410.

A computing system may determine an observed relative orientation between the vehicle 405 and the sensor array 410 attached to the vehicle. To determine the observed relative orientation, the computing system may compare the determined pose of the sensor array 405 and the determined pose of the vehicle 410. It is therefore desirable that the pose of the sensor array 405 and the vehicle 410 be expressed in the same fashion (e.g., using the same coordinate system). Depending on how the pose of each is represented, a conversion may be required between two or more coordinate systems into a single coordinate system. In particular embodiments, the pose of the vehicle 405 may be expressed based on the position and rotation of the camera 440 that imaged the vehicle 405. For example, the pose of the vehicle 405 may be expressed by the pose of the camera 440 relative to the vehicle 405 in a coordinate system oriented around the vehicle 405. The pose of the sensor array 410 may be similarly expressed by the pose of the camera 440 that imaged the sensor array 410 relative to the sensor array. Even if the camera 440 that imaged the vehicle 405 and the sensor array 410 may be the same camera 440, while determining the pose of the vehicle 405 and sensor array 410, the two may be determined independently (e.g., by ignoring imaged reference markers 435b and 436b when determining the pose of the vehicle 405, and vice versa). It may therefore be necessary to translate the pose of the sensor array 410 into the vehicle-oriented coordinate system, translate the pose of the vehicle 405 into the sensor array-oriented coordinate system, or translate both the pose of the sensor array 410 and the vehicle 405 into a third coordinate system (e.g., a camera-oriented coordinate system) before the observed relative orientation between the vehicle 405 and the sensor array 410 may be determined.

As another example, the pose of the vehicle 405 may be expressed by the orientation of the camera 440 that imaged the vehicle 405 relative to the pose of the camera 440 in a coordinate system oriented around the camera 440. Similarly, the pose of the sensor array 410 may be expressed by the pose of the camera 440 that imaged the sensor array 410 relative to the pose of the sensor array 410 in a coordinate system oriented around the camera 440. If the same camera 440 imaged both the vehicle 405 and sensor array 410, no coordinate-system translation may be necessary. If a separate camera 440 imaged the vehicle 405 and sensor array 410, it may be necessary to translate the pose of the vehicle 405 or the sensor array 410 into a shared coordinate system.

With the pose of the vehicle 405 and the pose of the sensor array 410 expressed as the orientation of the vehicle 405 and the sensor array 410 relative to the camera 440 (e.g., in a camera-oriented coordinate system), determining the observed relative orientation may comprise determining the relationship between the position and rotation of the vehicle 405 and the sensor array 410. This may be conceptualized as a process of determining how the vehicle 405 and the sensor array 410 fit together. Because both the pose of the vehicle 405 and the pose of the sensor array 410 are expressed relative to the same camera 440, determining the relative orientation may comprise determining distances between some or all reference markers observed on the vehicle (e.g., 430a and 431a) and some or all reference markers observed on the sensor array (e.g., 435a and 436a). Thus, a number of point-to-point distances may be compared to generate a mapping that describes the observed relative orientation. Other techniques for determining the orientation given the camera-oriented coordinate system may also be used.

With the pose of the vehicle 405 and the pose of the sensor array 410 expressed as the orientation of the camera 440 relative to the vehicle 405 and the orientation of the camera 440 relative to the sensor array 410, determining the observed relative orientation between the vehicle 405 and the sensor array 410 may comprise determining a difference between the position and rotation of the camera 440 for each. For example, the pose of the sensor array 410 may be determined by comparing imaged referenced markers (e.g., 435b and 436b) to the expected locations of the reference markers expressed by a model 600 (e.g., 435c and 436c). The pose may be expressed as the position of the camera 440 necessary to create the arrangement of the imaged reference markers. Similarly, the pose of the vehicle 405 may be expressed as the position of the camera 440 necessary to create the arrangement of imaged reference markers on the vehicle (430b and 431b).

A computing system may compare the observed relative orientation between the vehicle 405 and the sensor array 410 to an expected relative orientation between the vehicle 405 and the sensor array 410, as expressed by the self-consistent model 600. If there is a difference between the observed relative orientation and the expected relative orientation, this may indicate that the assembly of the vehicle 405 and the sensor array 410 was not performed exactly to the manufacturing specification. This comparison may be performed using a number of suitable techniques, depending on how the observed relative orientation of the vehicle 405 and the sensor array 410 was determined. For example, if the observed relative orientation of the vehicle 405 and the sensor array 410 was determined by reference to a mapping of distances between imaged reference markers on the vehicle (e.g., 430b and 431b) and imaged reference markers on the sensor array (e.g., 435b and 436b), the comparison of the observed relative orientation to the expected relative orientation may comprise comparison the "observed" mapping to a similar mapping for the distances between corresponding expected locations for reference markers as expressed by the model.

As another example, if the observed relative orientation between the vehicle 405 and the sensor array 410 is expressed as the orientation of the camera 440 relative to the vehicle 405, sensor array 410, or both, the comparison may comprise comparing the "observing" pose of the camera to an expected pose of the camera. The computing system may determine an orientation of a camera relative the model of the vehicle and the sensor array necessary to reproduce an arrangement of the detected reference markers on the vehicle to an orientation of a camera relative to the model of the vehicle and the sensor array necessary to reproduce an arrangement of the detected reference markers on the sensor array. This may be performed by a conversion of the pose of the camera 440 in one coordinate system to the pose of the camera in another coordinate system. A computing system may have determined, based on a comparison of the imaged reference markers (e.g., 430b and 431b) on the vehicle 405 to the expected locations of reference markers (e.g., 430c and 431c) a particular orientation of the camera necessary to result in the arrangement of reference markers in the image 500 of the vehicle 405. Similarly, a camera pose necessary to result in the arrangement of reference markers in the image 500 of the sensor array 410 may have been determined. If there is a deviation between the observed relative orientation and the expected relative orientation, these two camera poses may differ. That is, the pose of a single theoretical camera viewing the vehicle and sensor array as shown in the model 600 may differ from the pose of two cameras viewing the observed poses of the vehicle 405 and sensor array 410. Thus, the comparison of the expected relative orientation to the observed relative orientation may be performed by comparing the calculated camera poses. A difference between the camera pose needed to view the vehicle in the model in the same manner as the vehicle 405 captured in the image 500 and the camera pose needed to view sensor array in the model in the same manner as the sensor array 410 captured in the image 500 may reveal a deviation from the expected orientation. Converting the camera pose from a sensor array-centered coordinate system allows for a direct, and quantifiable, calculation of the difference.

Based on the comparison of the observed relative orientation between the sensor array 410 and the vehicle 405 to an expected relative orientation between the sensor array 410 and the vehicle 405, a computing system may determine calibration factors for measurements made by one or more vehicle sensors of the sensor array 410. The comparison of the observed relative orientation between the sensor array 410 and the vehicle 405 to the expected relative orientation between the sensor array 410 and the vehicle 405 may reveal that the observed relative orientation deviates from the expected relative orientation. Because, as discussed above, many of the vehicle sensors of the sensor array 410 may be high-precision instruments, even a minor deviation may impact the ability of the vehicle sensor to accurately capture measurement data or transmit the measurement data to other components that rely on the measurements. Therefore, it may be determined that the deviation between the observed relative orientation and the expected relative orientation has caused, or has the potential to cause, errors in measurements made by the vehicle sensor.

For example, if a vehicle sensor of the sensor array is an IMU including an accelerometer or gyroscope calibrated for expected motion of a vehicle based on an expected orientation between the sensor array and the vehicle, the deviation could cause the measurements made by the IMU to be misinterpreted by a vehicle navigation or operation system. For example, a computing system may attempt to determine the heading of the vehicle 405 based on the measurements of linear acceleration made by the accelerometer. If the observed relative orientation between the sensor array 410 attached to the vehicle 405 and the vehicle 405 deviates from the expected relative orientation, the linear acceleration measurements made by the accelerometer may deviate from the true heading (or thrust vector). Similarly, if a vehicle sensor of the sensor array is a lidar detector, the deviation could cause a computing system interpreting point clouds generated by the lidar detector to misinterpret the precise location of objects in an environment surrounding the vehicle.

Calibration factors may be determined to correct for the deviation. The calibration factors may include additional timing buffers for the data, offsets to be applied to distances or angular measurements to account for deviations in position or rotation of the vehicle sensor and/or sensor array, or any other suitable calibration factors. In particular embodiments, the calibration factors may be applied to subsequent measurements made by one or more vehicle sensors of the sensor array with little to no modification. In some embodiments, calibration factors specific to a particular vehicle sensor or sensor type may need to be determined and applied to subsequent measurements made by the vehicle sensor. The calibration factors may be passed to a controller of the vehicle sensor of the sensor array and may be incorporated into the measurements made by the vehicle sensor. The calibration factors may be used by a computing system associated with the vehicle when interpreting and relying on the sensor data.

Figure 7:
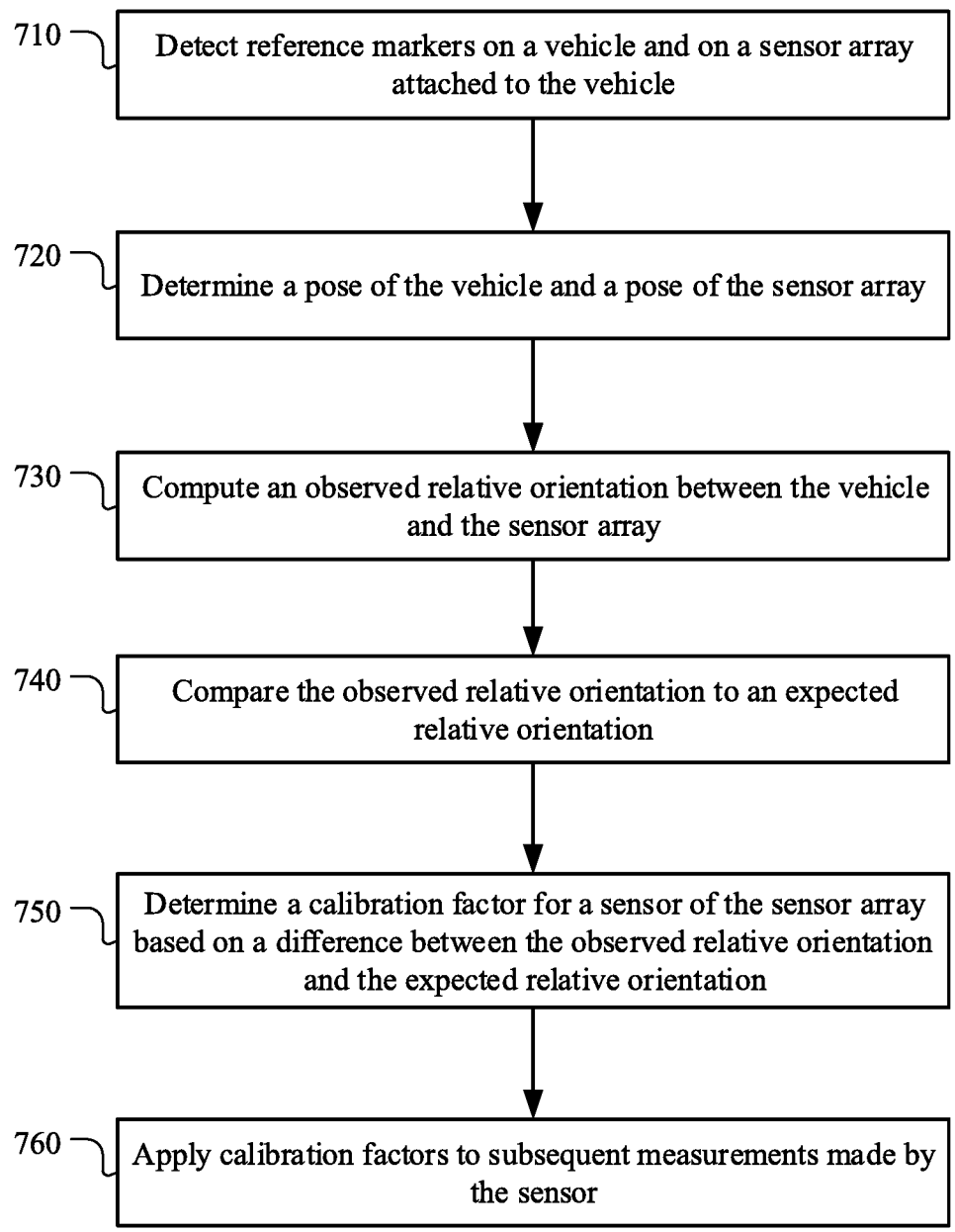
FIG. 7 illustrates an example of a method for sensor array to vehicle body alignment calibration.

FIG. 7 illustrates an example method 700 for sensor array to vehicle body alignment calibration. The method may begin at step 710, where a computing device associated with a vehicle may detect one or more reference markers on a vehicle and one or more reference markers on a sensor array attached to the vehicle. The vehicle may be a human-operated vehicle, a remotely operated vehicle, or an autonomous vehicle. The reference markers may be detected by one or more cameras attached to the vehicle or sensor array, or by one or more cameras in an environment surrounding the vehicle. The cameras may detect the reference markers by capturing the reference markers in an image of the vehicle, an image of the sensor array, or an image of both the vehicle and the sensor array. The reference markers may be a variety of camera-detectable marks, including, but not limited to, retroreflective dots, fiducial markers, LEDs, or particular features of the vehicle and the sensor array. In some embodiments, the reference makers on the vehicle may be distinct from the reference markers on the sensor array to assist with detect and processing. In some embodiments, the reference markers may be projected onto the vehicle or sensor array prior to their detection.

At step 720, a computing system associated with the vehicle may determine a pose of the vehicle and a pose of the sensor array. Determining the pose of the vehicle or the pose of the sensor array may comprise comparing the detected locations of the reference markers on the vehicle or on the sensor array to expected locations of corresponding reference markers shown in a self-consistent model of the vehicle and the sensor array.

Determining the pose of the vehicle or the pose of the sensor array may comprise determining a location of each reference marker of the detected reference markers within an image including the vehicle or the sensor array. Determining the pose of the vehicle or the sensor array may further comprise determining an orientation, relative to the vehicle or the sensor array, of a camera that captured the image based on a comparison of the observed location of each reference marker on the vehicle or the sensor array, respectively, in the image to an expected location of a corresponding reference marker specified by the model of the vehicle or the sensor array, respectively.

Determining the pose of the vehicle or the pose of the sensor array may comprise determining a location of each reference marker of the detected reference markers on the vehicle or the detected reference markers on the sensor array, respectively, within multiple images of the vehicle or the sensor array, respectively. Determining the pose of the vehicle or the sensor array may further comprise estimating an observed location of each reference marker on the vehicle or the sensor array based on a point-to-point correspondence of the location of the reference marker within each image of the plurality of images.

Determining the pose of the vehicle or the sensor array may further comprise comparing the estimated location of each reference marker to an expected location of a corresponding reference marker specified by the model of the vehicle and the sensor array. The pose of the vehicle may be expressed as the orientation of a camera, such as a camera that detected the reference markers on the vehicle, relative to the vehicle or as the orientation of the vehicle relative to the camera. The pose of the sensor array may be expressed as the orientation of a camera, such as a camera that detected the reference markers on the sensor array, relative to the sensor array or as the orientation of the sensor array relative to the vehicle.

At step 730, a computing system associated with the vehicle may compute an observed relative orientation between the vehicle and the sensor array. The observed relative orientation may correspond to the orientation of the vehicle and sensor array detected by the camera. The observed relative orientation between the vehicle and the sensor array may be computed based on a comparison of the determined pose of the vehicle and the determined pose of the sensor array. The observed relative orientation may be computed by calculating a distance between one or more reference makers on the vehicle as captured in an image of the vehicle and one or more reference markers on the sensor array as captured in an image of the sensor array.

At step 740, a computing system associated with the vehicle may compare the observed relative orientation between the vehicle and the sensor array attached to the vehicle to an expected relative orientation between the vehicle and the sensor array attached to the vehicle. The expected relative orientation may be expressed explicitly, such as through a list of specified differences between one or more particular reference markers on the vehicle and one or more particular reference markers on the sensor array. The expected relative orientation may be expressed implicitly, such as through a general arrangement of the vehicle and sensor array expressed in a manufacturing specification. The manufacturing specification may be conveyed through a model of the vehicle and the sensor array. The computing system may perform the comparison by comparing an orientation of a camera that detected reference markers on the vehicle and an orientation of a camera that detected reference markers on the sensor array to a determined orientation of a camera that views the model of the vehicle and the sensor array. The computing system may determine an orientation of a camera relative the model of the vehicle and the sensor array necessary to reproduce an arrangement of the detected reference markers on the vehicle to an orientation of a camera relative to the model of the vehicle and the sensor array necessary to reproduce an arrangement of the detected reference markers on the sensor array.

At step 750, a computing system associated with the vehicle may determine a calibration factor for a vehicle sensor of the sensor array attached to the vehicle based on a difference between the observed relative orientation between the vehicle and the sensor array and the expected relative orientation between the vehicle and the sensor array. A difference between the observed relative orientation and expected relative orientation may indicate that the vehicle and sensor array were not assembled to manufacturing specification, and any pre-calibration sensors of the sensor array may require recalibration. The calibration factor may correct a measurement error caused by a deviation of the observed relative orientation between the sensor array and the vehicle from the expected relative orientation between the sensor array and the vehicle specified by the model. The calibration factor may be determined while the vehicle is stationary or in motion.

At step 760, a computing system associated with the vehicle may apply the calibration factor for the vehicle sensor of the sensor array to a subsequent measurement made by the sensor. The calibration factor may be passed to a control of the sensor, and measurements received by a computing system associated with the vehicle may incorporate the calibration factor. The calibration factor may be passed to a navigation or guidance system of the vehicle, and the measurements may be used by the system for vehicle positioning or navigation.

Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for sensor array to vehicle body alignment calibration including the particular steps of the method of FIG. 7, this disclosure contemplates any suitable method for sensor array to vehicle body alignment calibration including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

In particular embodiments, calibration of a vehicle and a sensor array attached to the vehicle may be performed using data of one or more vehicle sensors of the vehicle. A manufacturing specification for the vehicle and sensor array may specify precise locations for one or more vehicle sensors on the vehicle and sensor array. The vehicle sensors may be calibrated to be consistent with each other in accordance with the locations specified by the manufacturing specification. The calibration of the vehicle sensors may then be tested and compared, and, if there is a variation in the result, unaccounted for by the specification-based calibration, it may be determined that the variation results from a deviation from the specification. Calibration factors may be determined to correct for that deviation.

Figure 8:
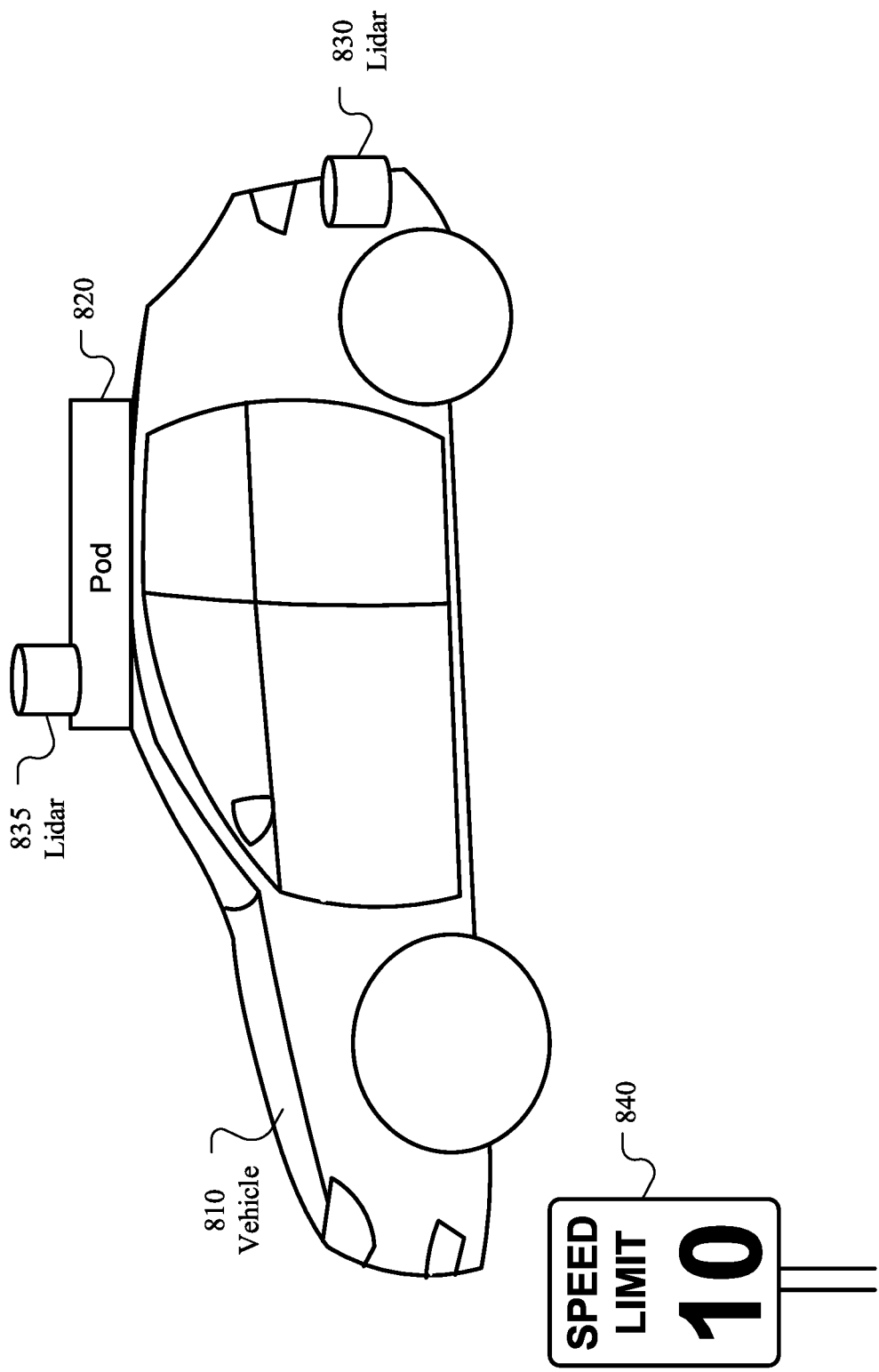
FIG. 8 illustrates an example technique for sensor array alignment calibration.

An example of sensor array to vehicle body calibration using co-calibrated vehicle sensors will now be explained with regards to FIG. 8. FIG. 8 illustrates a vehicle 810 and a sensor array 820 attached to that vehicle. Also attached to the vehicle 810 is a vehicle sensor 830. For this example, the vehicle sensor 830 will be described as a lidar detector, although any suitable vehicle sensor may be used. The vehicle sensor 830 is attached to a rear bumper of the vehicle 810. Any suitable mounting location for the vehicle sensor 830 may be used, such as front or rear bumper, door panel or roof, adjacent to one or more lights on the vehicle 810, or any other suitable location. Included in the sensor array 820 is another vehicle sensor 835. Like vehicle sensor 830, vehicle sensor 835 will be described as a lidar detector, but any suitable vehicle sensor could be used.

Prior to manufacture and assembly, a manufacturing specification (e.g., a self-consistent model) for vehicle 810 and sensor array 830 may specify the precise installation locations for the sensor array 820 and lidar detectors 830 and 835. Using the manufacturing specification, the lidar detectors 830 and 835 have been configured such that when making measurements, the data from both can be reliably used to generate a model of the environment around the vehicle 810. However, as discussed above, it is not uncommon for manufacturing specifications to include a permissible degree of variance, especially in placement of certain components. Thus, even when following the manufacturing specification, it is plausible that the lidar detectors 830 and 835 may be improperly calibrated relative to the reality of their placement.

The source of the miscalibration may be wide-ranging. For example, the rear bumper (or other vehicle component) to which the lidar detector 830 is attached may have been improperly mounted, or the mounting of the lidar detector 830 may have been done incorrectly. Similarly, the sensor array 820 may have been improperly mounted to the vehicle 810 or the lidar detector 835 may have been improperly mounted within the sensor array 820. Additionally, there may be errors in the sensing components of either of the lidar detectors 830 or 835. Especially if the sensor array 820 is improperly mounted, or if other components rely on the attachment of the rear bumper to the vehicle, the miscalibration may affect more than just the lidar detectors 830 or 835.

In some embodiments, it may be desirable to employ a holistic calibration procedure that determines errors in the system generally (as opposed to error with respect to individual components) and generates calibration factors to correct them. From this master calibration factor, one may derive other calibration factors for individual components. For example, if one is interested in ensuring the proper calibration of the two lidar detectors 830 and 835, it may be simpler to detect and correct the errors, rather than correct for each error among the possible culprits (e.g., the lidar detector 830, the rear bumper of the vehicle 810, the roof of the vehicle 810, the sensor array 820, or the lidar detector 835).

In particular embodiments, to calibrate the two lidar detectors 830 and 835 (or co-calibrate the lidar detectors 830 and 835), the lidar detectors 830 and 835 may be instructed to detect the environment around the vehicle 810. In a staged, or structured, environment, there may be positioned an object used specifically to calibrate the lidar detectors 830 and 835 (or other vehicle sensors, depending on the vehicle sensor configuration). This object may be designed specifically to calibrate the lidar detectors 830 or 835, or may be an object of known dimensions and properties. A staged environment may include a specific calibration stage, used as part of vehicle testing or maintenance. Any pre-calculated calibration factors (e.g., generated based on the manufacturing specification) may be applied to the measurements made by each lidar detector 830 and 835. The measurements made by the lidar detectors 830 and 835 may then be compared. For example, the point clouds generated by the lidar detectors 830 and 835 may be compared.

Because the pre-calculated calibration factors are expected to eliminate differences between the measurement data made by each lidar detector 830 and 835, it may be assumed that any difference (e.g., relative perturbations in the point clouds) are caused by deviations from the manufacturing specification or errors in the lidar detectors. For example, the relative orientation between the lidar detectors 830 and 835 by reference to the object may be determined. This determined relative orientation may be compared to a relative orientation between the lidar detectors 830 and 835 defined by the manufacturing specification. Calibration factors may be calculated to correct for the measured differences so that the lidar detectors may be used simultaneously. Additionally, the differences in measurements made by the lidar detectors 830 and 835 may be used to generate calibration factors for the other vehicle sensors of the sensor array 820. For example, the determined relative orientation between the lidar detectors 830 and 835 may be attributed to the relative orientation between the vehicle 810 and sensor array 820. Calibration factors for all vehicle sensors relying on a relative orientation between the vehicle 810 and sensor array 820 may be determined based on the measurements made by the lidar detectors 830 and 835.

In some embodiments, it may be impractical to return a vehicle 810 to a calibration stage whenever re-calibration of the relative orientation between lidar detectors 830 and 835 is desired. For example, a vehicle may be in use 810 (e.g., transporting passenger or cargo) and a calibration stage may not be conveniently located. A computing system of the vehicle may perform a calibration procedure based on objects in the un-staged environment around the vehicle. An un-staged environment may refer to an environment surrounding the vehicle that has not been specifically constructed for use for a particular purpose for the vehicle. For example, an un-staged environment may be the roads and other travel infrastructure used by the vehicle while in use. Furthermore, the ability to calibrate the relative orientation between vehicle sensors of a vehicle using an un-staged environment may allow the vehicle sensors to be re-calibrated more frequently. Thus, less expensive vehicle sensors (e.g., ones that are capable of holding their precision longer) may be used without sacrificing performance levels.

The calibration procedure for an un-staged environment may be similar to that described above with respect to a structured environment. However, because there are no specially designed calibration objects, the calibration procedure may rely on one or more objects of known shape and size found in the environment. For example, as illustrated in FIG. 8, an object such as a speed limit sign 840 may be used, because the dimensions of the object 840 are mandated by safety regulations. Because the dimensions are known, it may be possible to determine a relative orientation between the lidar detectors 830 and 835 by reference to the object. Other suitable objects may include other traffic signs (e.g., stop signs, yield signs, etc.), other traffic elements (e.g., traffic lights, other vehicles or vehicle components), signage (e.g., logos or address markers on buildings of a known shape and size), landmarks, pre-measured objects (e.g., strategically placed calibration objects in high-traffic areas), or any other suitable un-staged calibration objects.

Because lidar detectors operate quickly (e.g., making several measurements per second), it may be possible for the computing system of the vehicle 810 to perform the described un-staged calibration procedure while the vehicle is at rest or is in motion. The computing system may determine that the vehicle 810 is in an environment where it is safe for it to perform the calibration procedure. For example, if the vehicle 810 is at rest, the computing system may determine that there is a low probability that the lidar detectors 830 and 835 will be needed in the amount of time it takes for the calibration procedure to be completed (e.g., there are no approaching emergency vehicles). If the vehicle is in motion, using the vehicle sensors of the vehicle 810 the computing system may determine that there are few pedestrians, vehicles, or obstacles in the environment around the vehicle 810 before initializing the calibration procedure.

Figure 9:
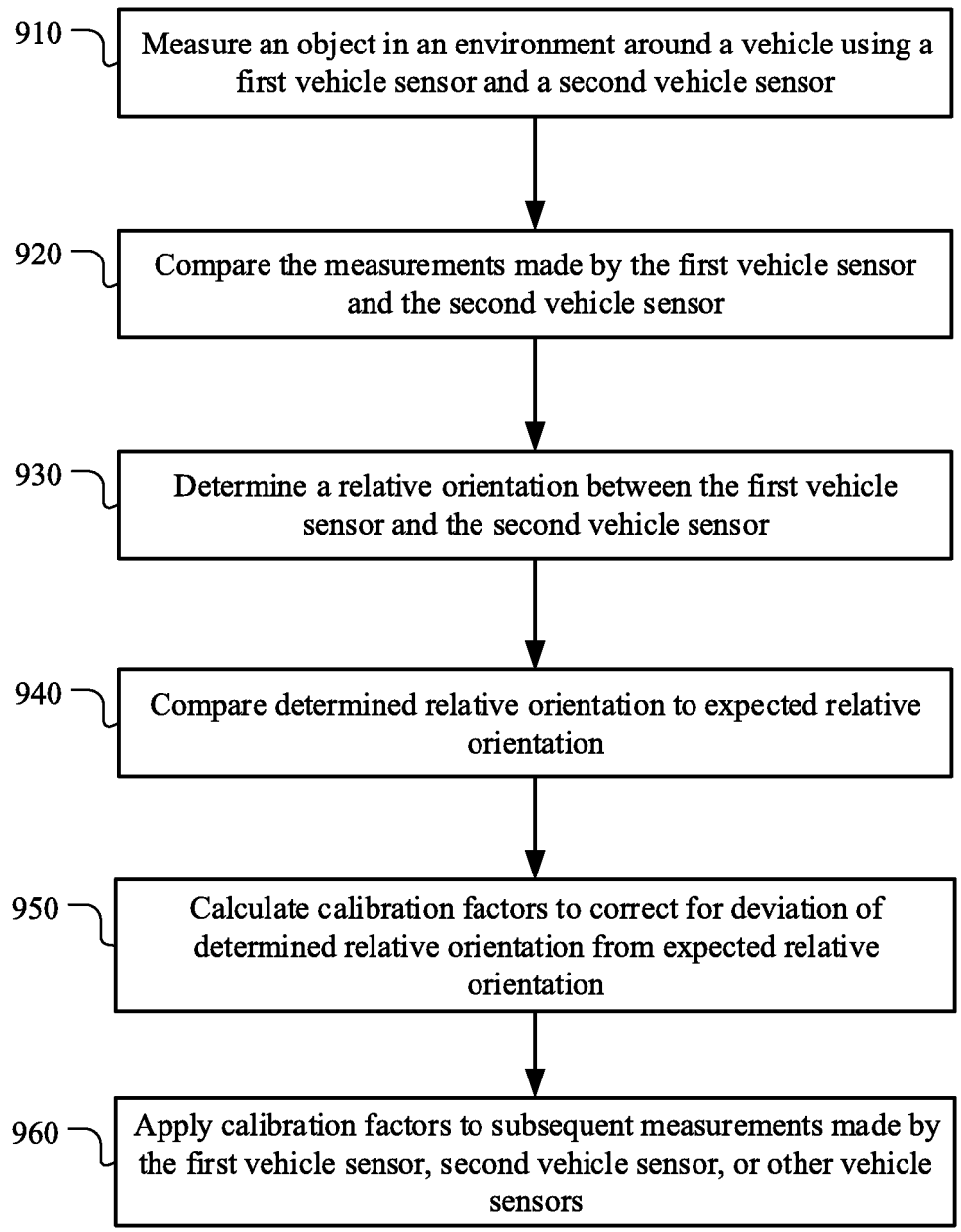
FIG. 9 illustrates an example of a method for sensor array to vehicle body alignment calibration.

FIG. 9 illustrates an example method 900 for sensor array to vehicle body alignment calibration. The method may begin at step 910, where a computing system associated with a vehicle (e.g., either installed in said vehicle, or in communication with said vehicle through any suitable communication means) instructs at least a first vehicle sensor and a second vehicle sensor to measure an object in an environment surrounding the vehicle. In particular embodiments, the vehicle sensor may be one or more of a lidar detector, radar detector, camera, or any other suitable vehicle sensor. For example, the first vehicle sensor and second vehicle sensor may be lidar detectors and measuring the object in the environment surrounding the vehicle may comprise the first vehicle sensor and second vehicle sensor generating one or more point clouds based on the object and the rest of the environment. As another example, the first vehicle sensor and second vehicle sensor may be cameras and measuring the object in the environment surrounding the vehicle may comprise capturing the object in one or more images.

At step 920, a computing system may compare the measurements made by the first vehicle sensor to the measurements made by the second vehicle sensor. The computing system may apply one or more pre-existing calibration or configuration factors to the measurements of the first vehicle sensor or second vehicle sensor before comparing the measurements. For example, the first vehicle sensor and second vehicle sensor may have been calibrated individually or relative to each other based on a manufacturing specification or self-consistent model of a vehicle 810, a sensor array 820, or the sensors (e.g., lidar detectors 830 and 835). The computing system may compare all the measurements or only a select subset of the measurements as dictated by the particular type of vehicle sensor or the operating environment. For example, the computing system may compare an entire point cloud generated by the vehicle sensors or may compare a subset of the point cloud determined to be relevant to sensor calibration.

At step 930, a computing system may determine a relative orientation between the first vehicle sensor and the second vehicle sensor based on the comparison of the measurements made by the first vehicle sensor and the second vehicle sensor. In particular embodiments, the relative orientation may be expressed by reference to the measured object in the environments around the vehicle. For example, a computing system may determine a coordinate system with the object as the origin and determine an orientation between each of the vehicle sensors (e.g., lidar detectors 830 and 835 and the object 840). A computing system may then compare the orientations of the vehicle sensors in the object-centered coordinate system. The relative orientation may be expressed by reference to a universal or world coordinate system. A computing system may determine an arbitrary origin for a coordinate system and may determine the pose of the object and vehicle sensors within that coordinate system. The computing system may determine the relative orientation between the first vehicle sensor and second vehicle sensor based on a determination of the pose of the first vehicle sensor and second vehicle sensor.

At step 940, a computing system may compare the determined relative orientation between the first vehicle sensor and the second vehicle sensor to an expected relative orientation between the first vehicle sensor and the second vehicle sensor. The expected relative orientation may be expressed by a manufacturing specification for a vehicle and a sensor array, the specification comprising the first vehicle sensor and second vehicle sensor. The manufacturing specification may comprise a self-consistent three-dimensional model of the vehicle and/or a sensor array that comprises one of the first vehicle sensor or second vehicle sensor. The expected relative orientation may be stated expressly or implicitly, being based on expected orientations of other components described by the manufacturing specification. For example, the expected relative orientation between the first vehicle sensor and the second vehicle sensor may be determined based on an expected relative orientation between a vehicle 810 and one or more vehicle components (e.g., a rear bumper), or an expected relative orientation between a vehicle 810 and a sensor array 820.

At step 950, the computing system may calculate one or more calibration factors for the first vehicle sensor, the second vehicle sensor, or any other vehicle sensor. The calibration factors may include offset values to be applied to one or more subsequent measurements made by one or more vehicle sensors. For example, the calibration factors may be location- or time-based offset values that automatically adjust the measurements made by a vehicle sensor. The calibration factors may be calculated to correct for a deviation of the determined relative orientation between a first vehicle sensor and a second vehicle sensor from the expected relative orientation between the first vehicle sensor and the second vehicle sensor. The calibration factors may further be calculated to correct for a deviation of a determined relative orientation between the vehicle 810 and the first vehicle sensor 830, second vehicle sensor 835, or a sensor array 820 attached to the vehicle from an expected relative orientation of the same.

At step 960, a computing system may apply one or more calibration factors to subsequent measurements made by the first vehicle sensor, the second vehicle sensor, or other vehicle sensors of the vehicle. In particular embodiments, the computing system may use the calculated calibration factors to correct one or more measurements made by the first vehicle sensor or second vehicle sensor. The calculated calibration factors may have been passed to the respective vehicle sensors, such that data received by a computing system of the vehicle may already include the calibration factors. The calculated calibration factors may be passed to a computing system of the vehicle, so that it may interpret the output of the respective vehicle sensors accordingly. In particular embodiments, the computing system may use the calculated calibration factors while correcting one or more measurements made by other vehicle sensors of the vehicle. The calibration factors may be modified or augmented as necessary to apply to the other vehicle sensors. For example, a modified calibration factor may incorporate an expected relative orientation between the other vehicle sensor and one or more of the first vehicle sensor or the second vehicle sensor.

Particular embodiments may repeat one or more steps of the method of FIG. 9, where appropriate. Although this disclosure describes and illustrates particular steps of the method of FIG. 9 as occurring in a particular order, this disclosure contemplates any suitable steps of the method of FIG. 9 occurring in any suitable order. Moreover, although this disclosure describes and illustrates an example method for sensor array to vehicle body alignment calibration including the particular steps of the method of FIG. 9, this disclosure contemplates any suitable method for sensor array to vehicle body alignment calibration including any suitable steps, which may include all, some, or none of the steps of the method of FIG. 9, where appropriate. Furthermore, although this disclosure describes and illustrates particular components, devices, or systems carrying out particular steps of the method of FIG. 9, this disclosure contemplates any suitable combination of any suitable components, devices, or systems carrying out any suitable steps of the method of FIG. 9.

Figure 10:
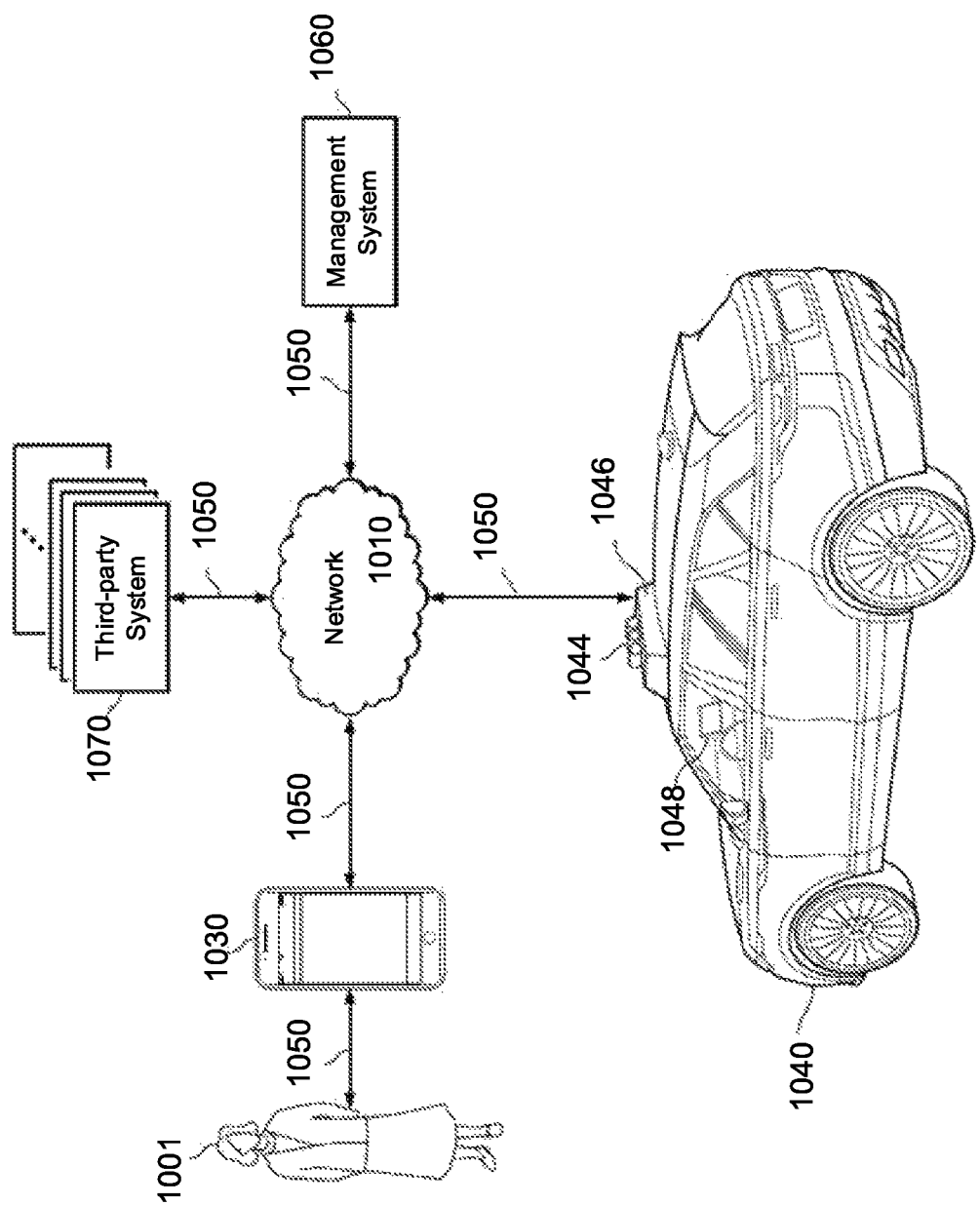
FIG. 10 illustrates an example block diagram of a transportation management environment for matching ride requestors with autonomous vehicles.

FIG. 10 illustrates an example block diagram of a transportation management environment for matching ride requestors with autonomous vehicles. In particular embodiments, the environment may include various computing entities, such as a user computing device 1030 of a user 1001 (e.g., a ride provider or requestor), a transportation management system 1060, an autonomous vehicle 1040, and one or more third-party system 1070. The computing entities may be communicatively connected over any suitable network 1010. As an example and not by way of limitation, one or more portions of network 1010 may include an ad hoc network, an extranet, a virtual private network (VPN), a local area network (LAN), a wireless LAN (WLAN), a wide area network (WAN), a wireless WAN (WWAN), a metropolitan area network (MAN), a portion of the Internet, a portion of Public Switched Telephone Network (PSTN), a cellular network, or a combination of any of the above. In particular embodiments, any suitable network arrangement and protocol enabling the computing entities to communicate with each other may be used. Although FIG. 10 illustrates a single user device 1030, a single transportation management system 1060, a single vehicle 1040, a plurality of third-party systems 1070, and a single network 1010, this disclosure contemplates any suitable number of each of these entities. As an example and not by way of limitation, the network environment may include multiple users 1001, user devices 1030, transportation management systems 1060, autonomous-vehicles 1040, third-party systems 1070, and networks 1010.

The user device 1030, transportation management system 1060, autonomous vehicle 1040, and third-party system 1070 may be communicatively connected or co-located with each other in whole or in part. These computing entities may communicate via different transmission technologies and network types. For example, the user device 1030 and the vehicle 1040 may communicate with each other via a cable or short-range wireless communication (e.g., Bluetooth, NFC, WI-FI, etc.), and together they may be connected to the Internet via a cellular network that is accessible to either one of the devices (e.g., the user device 1030 may be a smartphone with LTE connection). The transportation management system 1060 and third-party system 1070, on the other hand, may be connected to the Internet via their respective LAN/WLAN networks and Internet Service Providers (ISP). FIG. 10 illustrates transmission links 1050 that connect user device 1030, autonomous vehicle 1040, transportation management system 1060, and third-party system 1070 to communication network 1010. This disclosure contemplates any suitable transmission links 1050, including, e.g., wire connections (e.g., USB, Lightning, Digital Subscriber Line (DSL) or Data Over Cable Service Interface Specification (DOCSIS)), wireless connections (e.g., WI-FI, WiMAX, cellular, satellite, NFC, Bluetooth), optical connections (e.g., Synchronous Optical Networking (SONET), Synchronous Digital Hierarchy (SDH)), any other wireless communication technologies, and any combination thereof. In particular embodiments, one or more links 1050 may connect to one or more networks 1010, which may include in part, e.g., ad-hoc network, the Intranet, extranet, VPN, LAN, WLAN, WAN, WWAN, MAN, PSTN, a cellular network, a satellite network, or any combination thereof. The computing entities need not necessarily use the same type of transmission link 1050. For example, the user device 1030 may communicate with the transportation management system via a cellular network and the Internet, but communicate with the autonomous vehicle 1040 via Bluetooth or a physical wire connection.

In particular embodiments, the transportation management system 1060 may fulfill ride requests for one or more users 1001 by dispatching suitable vehicles. The transportation management system 1060 may receive any number of ride requests from any number of ride requestors 1001. In particular embodiments, a ride request from a ride requestor 1001 may include an identifier that identifies the ride requestor in the system 1060. The transportation management system 1060 may use the identifier to access and store the ride requestor's 1001 information, in accordance with the requestor's 1001 privacy settings. The ride requestor's 1001 information may be stored in one or more data stores (e.g., a relational database system) associated with and accessible to the transportation management system 1060. In particular embodiments, ride requestor information may include profile information about a particular ride requestor 1001. In particular embodiments, the ride requestor 1001 may be associated with one or more categories or types, through which the ride requestor 1001 may be associated with aggregate information about certain ride requestors of those categories or types. Ride information may include, for example, preferred pick-up and drop-off locations, driving preferences (e.g., safety comfort level, preferred speed, rates of acceleration/deceleration, safety distance from other vehicles when travelling at various speeds, route, etc.), entertainment preferences and settings (e.g., preferred music genre or playlist, audio volume, display brightness, etc.), temperature settings, whether conversation with the driver is welcomed, frequent destinations, historical riding patterns (e.g., time of day of travel, starting and ending locations, etc.), preferred language, age, gender, or any other suitable information. In particular embodiments, the transportation management system 1060 may classify a user 1001 based on known information about the user 1001 (e.g., using machine-learning classifiers), and use the classification to retrieve relevant aggregate information associated with that class. For example, the system 1060 may classify a user 1001 as a young adult and retrieve relevant aggregate information associated with young adults, such as the type of music generally preferred by young adults.

Transportation management system 1060 may also store and access ride information. Ride information may include locations related to the ride, traffic data, route options, optimal pick-up or drop-off locations for the ride, or any other suitable information associated with a ride. As an example and not by way of limitation, when the transportation management system 1060 receives a request to travel from San Francisco International Airport (SFO) to Palo Alto, Calif., the system 1060 may access or generate any relevant ride information for this particular ride request. The ride information may include, for example, preferred pick-up locations at SFO; alternate pick-up locations in the event that a pick-up location is incompatible with the ride requestor (e.g., the ride requestor may be disabled and cannot access the pick-up location) or the pick-up location is otherwise unavailable due to construction, traffic congestion, changes in pick-up/drop-off rules, or any other reason; one or more routes to navigate from SFO to Palo Alto; preferred off-ramps for a type of user; or any other suitable information associated with the ride. In particular embodiments, portions of the ride information may be based on historical data associated with historical rides facilitated by the system 1060. For example, historical data may include aggregate information generated based on past ride information, which may include any ride information described herein and telemetry data collected by sensors in autonomous vehicles and/or user devices. Historical data may be associated with a particular user (e.g., that particular user's preferences, common routes, etc.), a category/class of users (e.g., based on demographics), and/or all users of the system 1060. For example, historical data specific to a single user may include information about past rides that particular user has taken, including the locations at which the user is picked up and dropped off, music the user likes to listen to, traffic information associated with the rides, time of the day the user most often rides, and any other suitable information specific to the user. As another example, historical data associated with a category/class of users may include, e.g., common or popular ride preferences of users in that category/class, such as teenagers preferring pop music, ride requestors who frequently commute to the financial district may prefer to listen to the news, etc. As yet another example, historical data associated with all users may include general usage trends, such as traffic and ride patterns. Using historical data, the system 1060 in particular embodiments may predict and provide ride suggestions in response to a ride request. In particular embodiments, the system 1060 may use machine-learning, such as neural networks, regression algorithms, instance-based algorithms (e.g., k-Nearest Neighbor), decision-tree algorithms, Bayesian algorithms, clustering algorithms, association-rule-learning algorithms, deep-learning algorithms, dimensionality-reduction algorithms, ensemble algorithms, and any other suitable machine-learning algorithms known to persons of ordinary skill in the art. The machine-learning models may be trained using any suitable training algorithm, including supervised learning based on labeled training data, unsupervised learning based on unlabeled training data, and/or semi-supervised learning based on a mixture of labeled and unlabeled training data.

In particular embodiments, transportation management system 1060 may include one or more server computers. Each server may be a unitary server or a distributed server spanning multiple computers or multiple datacenters. The servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by the server. In particular embodiments, transportation management system 1060 may include one or more data stores. The data stores may be used to store various types of information, such as ride information, ride requestor information, ride provider information, historical information, third-party information, or any other suitable type of information. In particular embodiments, the information stored in the data stores may be organized according to specific data structures. In particular embodiments, each data store may be a relational, columnar, correlation, or any other suitable type of database system. Although this disclosure describes or illustrates particular types of databases, this disclosure contemplates any suitable types of databases. Particular embodiments may provide interfaces that enable a user device 1030 (which may belong to a ride requestor or provider), a transportation management system 1060, vehicle system 1040, or a third-party system 1070 to process, transform, manage, retrieve, modify, add, or delete the information stored in the data store.

In particular embodiments, transportation management system 1060 may include an authorization server (or any other suitable component(s)) that allows users 1001 to opt-in to or opt-out of having their information and actions logged, recorded, or sensed by transportation management system 1060 or shared with other systems (e.g., third-party systems 1070). In particular embodiments, a user 1001 may opt-in or opt-out by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users 1001 of transportation management system 1060 through blocking, data hashing, anonymization, or other suitable techniques as appropriate.

In particular embodiments, third-party system 1070 may be a network-addressable computing system that may provide HD maps or host GPS maps, customer reviews, music or content, weather information, or any other suitable type of information. Third-party system 1070 may generate, store, receive, and send relevant data, such as, for example, map data, customer review data from a customer review website, weather data, or any other suitable type of data. Third-party system 1070 may be accessed by the other computing entities of the network environment either directly or via network 1010. For example, user device 1030 may access the third-party system 1070 via network 1010, or via transportation management system 1060. In the latter case, if credentials are required to access the third-party system 1070, the user 1001 may provide such information to the transportation management system 1060, which may serve as a proxy for accessing content from the third-party system 1070.

In particular embodiments, user device 1030 may be a mobile computing device such as a smartphone, tablet computer, or laptop computer. User device 1030 may include one or more processors (e.g., CPU and/or GPU), memory, and storage. An operating system and applications may be installed on the user device 1030, such as, e.g., a transportation application associated with the transportation management system 1060, applications associated with third-party systems 1070, and applications associated with the operating system. User device 1030 may include functionality for determining its location, direction, or orientation, based on integrated sensors such as GPS, compass, gyroscope, or accelerometer. User device 1030 may also include wireless transceivers for wireless communication and may support wireless communication protocols such as Bluetooth, near-field communication (NFC), infrared (IR) communication, WI-FI, and/or 2G/3G/4G/LTE mobile communication standard. User device 1030 may also include one or more cameras, scanners, touchscreens, microphones, speakers, and any other suitable input-output devices.

In particular embodiments, the vehicle 1040 may be an autonomous vehicle and equipped with an array of sensors 1044, a navigation system 1046, and a ride-service computing device 1048. In particular embodiments, a fleet of autonomous vehicles 1040 may be managed by the transportation management system 1060. The fleet of autonomous vehicles 1040, in whole or in part, may be owned by the entity associated with the transportation management system 1060, or they may be owned by a third-party entity relative to the transportation management system 1060. In either case, the transportation management system 1060 may control the operations of the autonomous vehicles 1040, including, e.g., dispatching select vehicles 1040 to fulfill ride requests, instructing the vehicles 1040 to perform select operations (e.g., head to a service center or charging/fueling station, pull over, stop immediately, self-diagnose, lock/unlock compartments, change music station, change temperature, and any other suitable operations), and instructing the vehicles 1040 to enter select operation modes (e.g., operate normally, drive at a reduced speed, drive under the command of human operators, and any other suitable operational modes).

In particular embodiments, the autonomous vehicles 1040 may receive data from and transmit data to the transportation management system 1060 and the third-party system 1070. Example of received data may include, e.g., instructions, new software or software updates, maps, 3D models, trained or untrained machine-learning models, location information (e.g., location of the ride requestor, the autonomous vehicle 1040 itself, other autonomous vehicles 1040, and target destinations such as service centers), navigation information, traffic information, weather information, entertainment content (e.g., music, video, and news) ride requestor information, ride information, and any other suitable information. Examples of data transmitted from the autonomous vehicle 1040 may include, e.g., telemetry and sensor data, determinations/decisions based on such data, vehicle condition or state (e.g., battery/fuel level, tire and brake conditions, sensor condition, speed, odometer, etc.), location, navigation data, passenger inputs (e.g., through a user interface in the vehicle 1040, passengers may send/receive data to the transportation management system 1060 and/or third-party system 1070), and any other suitable data.

In particular embodiments, autonomous vehicles 1040 may also communicate with each other as well as other traditional human-driven vehicles, including those managed and not managed by the transportation management system 1060. For example, one vehicle 1040 may communicate with another vehicle data regarding their respective location, condition, status, sensor reading, and any other suitable information. In particular embodiments, vehicle-to-vehicle communication may take place over direct short-range wireless connection (e.g., WI-FI, Bluetooth, NFC) and/or over a network (e.g., the Internet or via the transportation management system 1060 or third-party system 1070).

In particular embodiments, an autonomous vehicle 1040 may obtain and process sensor/telemetry data. Such data may be captured by any suitable sensors. For example, the vehicle 1040 may have aa Light Detection and Ranging (LiDAR) sensor array of multiple LiDAR transceivers that are configured to rotate 360°, emitting pulsed laser light and measuring the reflected light from objects surrounding vehicle 1040. In particular embodiments, LiDAR transmitting signals may be steered by use of a gated light valve, which may be a MEMs device that directs a light beam using the principle of light diffraction. Such a device may not use a gimbaled mirror to steer light beams in 360° around the autonomous vehicle. Rather, the gated light valve may direct the light beam into one of several optical fibers, which may be arranged such that the light beam may be directed to many discrete positions around the autonomous vehicle. Thus, data may be captured in 360° around the autonomous vehicle, but no rotating parts may be necessary. A LiDAR is an effective sensor for measuring distances to targets, and as such may be used to generate a three-dimensional (3D) model of the external environment of the autonomous vehicle 1040. As an example and not by way of limitation, the 3D model may represent the external environment including objects such as other cars, curbs, debris, objects, and pedestrians up to a maximum range of the sensor arrangement (e.g., 50, 100, or 200 meters). As another example, the autonomous vehicle 1040 may have optical cameras pointing in different directions. The cameras may be used for, e.g., recognizing roads, lane markings, street signs, traffic lights, police, other vehicles, and any other visible objects of interest. To enable the vehicle 1040 to "see" at night, infrared cameras may be installed. In particular embodiments, the vehicle may be equipped with stereo vision for, e.g., spotting hazards such as pedestrians or tree branches on the road. As another example, the vehicle 1040 may have radars for, e.g., detecting other vehicles and/or hazards afar. Furthermore, the vehicle 1040 may have ultrasound equipment for, e.g., parking and obstacle detection. In addition to sensors enabling the vehicle 1040 to detect, measure, and understand the external world around it, the vehicle 1040 may further be equipped with sensors for detecting and self-diagnosing the vehicle's own state and condition. For example, the vehicle 1040 may have wheel sensors for, e.g., measuring velocity; global positioning system (GPS) for, e.g., determining the vehicle's current geolocation; and/or inertial measurement units, accelerometers, gyroscopes, and/or odometer systems for movement or motion detection. While the description of these sensors provides particular examples of utility, one of ordinary skill in the art would appreciate that the utilities of the sensors are not limited to those examples. Further, while an example of a utility may be described with respect to a particular type of sensor, it should be appreciated that the utility may be achieved using any combination of sensors. For example, an autonomous vehicle 1040 may build a 3D model of its surrounding based on data from its LiDAR, radar, sonar, and cameras, along with a pre-generated map obtained from the transportation management system 1060 or the third-party system 1070. Although sensors 1044 appear in a particular location on autonomous vehicle 1040 in FIG. 10, sensors 1044 may be located in any suitable location in or on autonomous vehicle 1040. Example locations for sensors include the front and rear bumpers, the doors, the front windshield, on the side panel, or any other suitable location.

In particular embodiments, the autonomous vehicle 1040 may be equipped with a processing unit (e.g., one or more CPUs and GPUs), memory, and storage. The vehicle 1040 may thus be equipped to perform a variety of computational and processing tasks, including processing the sensor data, extracting useful information, and operating accordingly. For example, based on images captured by its cameras and a machine-vision model, the vehicle 1040 may identify particular types of objects captured by the images, such as pedestrians, other vehicles, lanes, curbs, and any other objects of interest.

In particular embodiments, the autonomous vehicle 1040 may have a navigation system 1046 responsible for safely navigating the autonomous vehicle 1040. In particular embodiments, the navigation system 1046 may take as input any type of sensor data from, e.g., a Global Positioning System (GPS) module, inertial measurement unit (IMU), LiDAR sensors, optical cameras, radio frequency (RF) transceivers, or any other suitable telemetry or sensory mechanisms. The navigation system 1046 may also utilize, e.g., map data, traffic data, accident reports, weather reports, instructions, target destinations, and any other suitable information to determine navigation routes and particular driving operations (e.g., slowing down, speeding up, stopping, swerving, etc.). In particular embodiments, the navigation system 1046 may use its determinations to control the vehicle 1040 to operate in prescribed manners and to guide the autonomous vehicle 1040 to its destinations without colliding into other objects. Although the physical embodiment of the navigation system 1046 (e.g., the processing unit) appears in a particular location on autonomous vehicle 1040 in FIG. 10, navigation system 1046 may be located in any suitable location in or on autonomous vehicle 1040. Example locations for navigation system 1046 include inside the cabin or passenger compartment of autonomous vehicle 1040, near the engine/battery, near the front seats, rear seats, or in any other suitable location.

In particular embodiments, the autonomous vehicle 1040 may be equipped with a ride-service computing device 1048, which may be a tablet or any other suitable device installed by transportation management system 1060 to allow the user to interact with the autonomous vehicle 1040, transportation management system 1060, other users 1001, or third-party systems 1070. In particular embodiments, installation of ride-service computing device 1048 may be accomplished by placing the ride-service computing device 1048 inside autonomous vehicle 1040, and configuring it to communicate with the vehicle 1040 via a wire or wireless connection (e.g., via Bluetooth). Although FIG. 10 illustrates a single ride-service computing device 1048 at a particular location in autonomous vehicle 1040, autonomous vehicle 1040 may include several ride-service computing devices 1048 in several different locations within the vehicle. As an example and not by way of limitation, autonomous vehicle 1040 may include four ride-service computing devices 1048 located in the following places: one in front of the front-left passenger seat (e.g., driver's seat in traditional U.S. automobiles), one in front of the front-right passenger seat, one in front of each of the rear-left and rear-right passenger seats. In particular embodiments, ride-service computing device 1048 may be detachable from any component of autonomous vehicle 1040. This may allow users to handle ride-service computing device 1048 in a manner consistent with other tablet computing devices. As an example and not by way of limitation, a user may move ride-service computing device 1048 to any location in the cabin or passenger compartment of autonomous vehicle 1040, may hold ride-service computing device 1048, or handle ride-service computing device 1048 in any other suitable manner. Although this disclosure describes providing a particular computing device in a particular manner, this disclosure contemplates providing any suitable computing device in any suitable manner.

Figure 11:
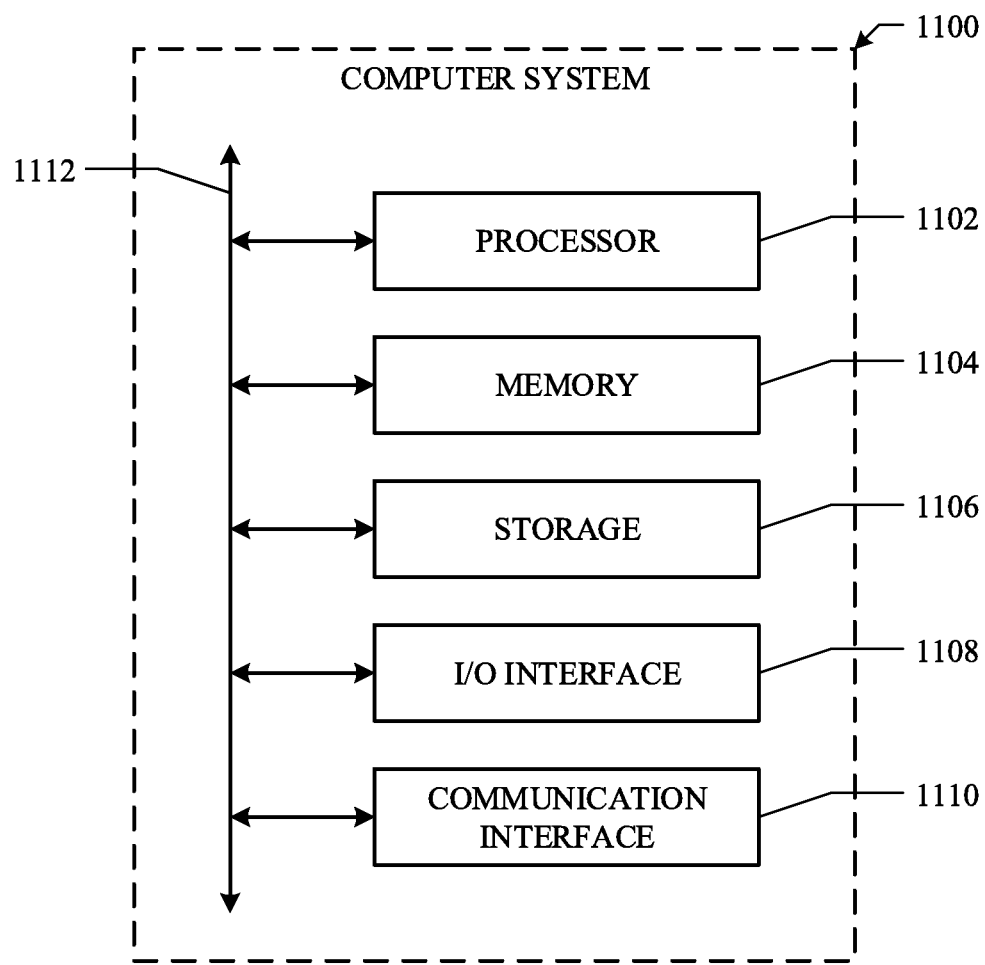
FIG. 11 illustrates an example of a computing system.

FIG. 11 illustrates an example computer system 1100. In particular embodiments, one or more computer systems 1100 perform one or more steps of one or more methods described or illustrated herein. In particular embodiments, one or more computer systems 1100 provide the functionalities described or illustrated herein. In particular embodiments, software running on one or more computer systems 1100 performs one or more steps of one or more methods described or illustrated herein or provides the functionalities described or illustrated herein. Particular embodiments include one or more portions of one or more computer systems 1100. Herein, a reference to a computer system may encompass a computing device, and vice versa, where appropriate. Moreover, a reference to a computer system may encompass one or more computer systems, where appropriate.

This disclosure contemplates any suitable number of computer systems 1100. This disclosure contemplates computer system 1100 taking any suitable physical form. As example and not by way of limitation, computer system 1100 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1100 may include one or more computer systems 1100; be unitary or distributed; span multiple locations; span multiple machines; span multiple data centers; or reside in a cloud, which may include one or more cloud components in one or more networks. Where appropriate, one or more computer systems 1100 may perform without substantial spatial or temporal limitation one or more steps of one or more methods described or illustrated herein. As an example and not by way of limitation, one or more computer systems 1100 may perform in real time or in batch mode one or more steps of one or more methods described or illustrated herein. One or more computer systems 1100 may perform at different times or at different locations one or more steps of one or more methods described or illustrated herein, where appropriate.

In particular embodiments, computer system 1100 includes a processor 1102, memory 1104, storage 1106, an input/output (I/O) interface 1108, a communication interface 1110, and a bus 1112. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1102 includes hardware for executing instructions, such as those making up a computer program. As an example and not by way of limitation, to execute instructions, processor 1102 may retrieve (or fetch) the instructions from an internal register, an internal cache, memory 1104, or storage 1106; decode and execute them; and then write one or more results to an internal register, an internal cache, memory 1104, or storage 1106. In particular embodiments, processor 1102 may include one or more internal caches for data, instructions, or addresses. This disclosure contemplates processor 1102 including any suitable number of any suitable internal caches, where appropriate. As an example and not by way of limitation, processor 1102 may include one or more instruction caches, one or more data caches, and one or more translation lookaside buffers (TLBs). Instructions in the instruction caches may be copies of instructions in memory 1104 or storage 1106, and the instruction caches may speed up retrieval of those instructions by processor 1102. Data in the data caches may be copies of data in memory 1104 or storage 1106 that are to be operated on by computer instructions; the results of previous instructions executed by processor 1102 that are accessible to subsequent instructions or for writing to memory 1104 or storage 1106; or any other suitable data. The data caches may speed up read or write operations by processor 1102. The TLBs may speed up virtual-address translation for processor 1102. In particular embodiments, processor 1102 may include one or more internal registers for data, instructions, or addresses. This disclosure contemplates processor 1102 including any suitable number of any suitable internal registers, where appropriate. Where appropriate, processor 1102 may include one or more arithmetic logic units (ALUs), be a multi-core processor, or include one or more processors 1102. Although this disclosure describes and illustrates a particular processor, this disclosure contemplates any suitable processor.

In particular embodiments, memory 1104 includes main memory for storing instructions for processor 1102 to execute or data for processor 1102 to operate on. As an example and not by way of limitation, computer system 1100 may load instructions from storage 1106 or another source (such as another computer system 1100) to memory 1104. Processor 1102 may then load the instructions from memory 1104 to an internal register or internal cache. To execute the instructions, processor 1102 may retrieve the instructions from the internal register or internal cache and decode them. During or after execution of the instructions, processor 1102 may write one or more results (which may be intermediate or final results) to the internal register or internal cache. Processor 1102 may then write one or more of those results to memory 1104. In particular embodiments, processor 1102 executes only instructions in one or more internal registers or internal caches or in memory 1104 (as opposed to storage 1106 or elsewhere) and operates only on data in one or more internal registers or internal caches or in memory 1104 (as opposed to storage 1106 or elsewhere). One or more memory buses (which may each include an address bus and a data bus) may couple processor 1102 to memory 1104. Bus 1112 may include one or more memory buses, as described in further detail below. In particular embodiments, one or more memory management units (MMUs) reside between processor 1102 and memory 1104 and facilitate accesses to memory 1104 requested by processor 1102. In particular embodiments, memory 1104 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1104 may include one or more memories 1104, where appropriate. Although this disclosure describes and illustrates particular memory, this disclosure contemplates any suitable memory.

In particular embodiments, storage 1106 includes mass storage for data or instructions. As an example and not by way of limitation, storage 1106 may include a hard disk drive (HDD), a floppy disk drive, flash memory, an optical disc, a magneto-optical disc, magnetic tape, or a Universal Serial Bus (USB) drive or a combination of two or more of these. Storage 1106 may include removable or non-removable (or fixed) media, where appropriate. Storage 1106 may be internal or external to computer system 1100, where appropriate. In particular embodiments, storage 1106 is non-volatile, solid-state memory. In particular embodiments, storage 1106 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1106 taking any suitable physical form. Storage 1106 may include one or more storage control units facilitating communication between processor 1102 and storage 1106, where appropriate. Where appropriate, storage 1106 may include one or more storages 1106. Although this disclosure describes and illustrates particular storage, this disclosure contemplates any suitable storage.

In particular embodiments, I/O interface 1108 includes hardware, software, or both, providing one or more interfaces for communication between computer system 1100 and one or more I/O devices. Computer system 1100 may include one or more of these I/O devices, where appropriate. One or more of these I/O devices may enable communication between a person and computer system 1100. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1108 for them. Where appropriate, I/O interface 1108 may include one or more device or software drivers enabling processor 1102 to drive one or more of these I/O devices. I/O interface 1108 may include one or more I/O interfaces 1108, where appropriate. Although this disclosure describes and illustrates a particular I/O interface, this disclosure contemplates any suitable I/O interface.

In particular embodiments, communication interface 1110 includes hardware, software, or both providing one or more interfaces for communication (such as, for example, packet-based communication) between computer system 1100 and one or more other computer systems 1100 or one or more networks. As an example and not by way of limitation, communication interface 1110 may include a network interface controller (NIC) or network adapter for communicating with an Ethernet or any other wire-based network or a wireless NIC (WNIC) or wireless adapter for communicating with a wireless network, such as a WI-FI network. This disclosure contemplates any suitable network and any suitable communication interface 1110 for it. As an example and not by way of limitation, computer system 1100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1100 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or any other suitable wireless network or a combination of two or more of these. Computer system 1100 may include any suitable communication interface 1110 for any of these networks, where appropriate. Communication interface 1110 may include one or more communication interfaces 1110, where appropriate.

Although this disclosure describes and illustrates a particular communication interface, this disclosure contemplates any suitable communication interface.

In particular embodiments, bus 1112 includes hardware, software, or both coupling components of computer system 1100 to each other. As an example and not by way of limitation, bus 1112 may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1112 may include one or more buses 1112, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:
   detecting two or more reference markers on a vehicle and two or more reference markers on a sensor array attached to the vehicle;
   determining a pose of the vehicle based on the detected reference markers on the vehicle and a model of the vehicle comprising expected locations of the detected reference markers on the vehicle;
   determining a pose of the sensor array based on the detected reference markers on the sensor array and a model of the sensor array comprising expected locations of the detected reference markers on the sensor array;
   computing an observed relative orientation between the sensor array and the vehicle based on a comparison of the determined pose of the sensor array and the determined pose of the vehicle; and
   determining a calibration factor for a sensor of the sensor array based on a comparison of the observed relative orientation between the sensor array and the vehicle to an expected relative orientation between the sensor array and the vehicle.

2. The method of claim 1, wherein determining the pose of the vehicle or the pose of the sensor array comprises:
   determining a location of each reference marker of the two or more reference markers on the vehicle or the two or more reference markers on the sensor array, respectively, within an image of the vehicle or the sensor array; and
   determining an orientation relative to the vehicle or the sensor array of a camera that captured the image based on a comparison of the location of each reference marker on the vehicle or the sensor array, respectively, in the image to an expected location of a corresponding reference marker specified by the model of the vehicle or the sensor array, respectively.

3. The method of claim 1, wherein determining the pose of the vehicle or the pose of the sensor array comprises:
   determining a location of each reference marker of the two or more reference markers on the vehicle or the two or more reference markers on the sensor array, respectively, within a plurality of images of the vehicle or the sensor array, respectively;
   computing an observed location of each reference marker on the vehicle or the sensor array based on the location of the reference marker within each image of the plurality of images; and
   comparing the observed location of each reference marker to an expected location of a corresponding reference marker specified by the model of the vehicle and the sensor array.

4. The method of claim 1, wherein detecting the two or more reference markers on the vehicle and the two or more reference markers on the sensor array attached to the vehicle comprises:
   capturing the reference markers on the vehicle and the reference markers on the sensor array in an image of the vehicle and sensor array.

5. The method of claim 1, further comprising:
   applying the calibration factor for the sensor of the sensor array to a subsequent measurement made by the sensor.

6. The method of claim 5, wherein the measurement made by the sensor is used for vehicle positioning or navigation.

7. The method of claim 1, wherein the calibration factor corrects a measurement error caused by a deviation of the observed relative orientation between the sensor array and the vehicle from the expected relative orientation between the sensor array and the vehicle specified by the model.

8. The method of claim 1, wherein the reference markers on the vehicle or the reference markers on the sensor array are detected by a camera attached to the vehicle.

9. The method of claim 8, wherein the calibration factor is determined while the vehicle is in motion.

10. The method of claim 1, wherein the reference markers on the vehicle or the reference markers on the sensor array comprise:
retroreflective dots;
fiducial markers;
light-emitting diodes; or
camera-detectable features of the vehicle or sensor array.

11. The method of claim 1, wherein the reference markers on the sensor array are distinct from the reference markers on the vehicle.

12. The method of claim 1, wherein the reference markers on the vehicle or the reference markers on the sensor array are projected onto the vehicle or the sensor array, respectively.

13. The method of claim 1, wherein:
the pose of the vehicle is represented by an orientation of a camera relative to the vehicle or an orientation of the vehicle relative to the camera; or
the pose of the sensor array is represented by an orientation of a camera relative to the sensor array or an orientation of the sensor array relative to the camera.

14. The method of claim 1, wherein the vehicle is an autonomous vehicle.

15. A system comprising: one or more processors and one or more computer-readable non-transitory storage media coupled to one or more of the processors, the one or more computer-readable non-transitory storage media comprising instructions operable when executed by one or more of the processors to cause the system to perform operations comprising:
detecting two or more reference markers on a vehicle and two or more reference markers on a sensor array attached to the vehicle;
determining a pose of the vehicle based on the detected reference markers on the vehicle and a model of the vehicle comprising expected locations of the detected reference markers on the vehicle;
determining a pose of the sensor array based on the detected reference markers on the sensor array and a model of the sensor array comprising expected locations of the detected reference markers on the sensor array;
computing an observed relative orientation between the sensor array and the vehicle based on a comparison of the determined pose of the sensor array and the determined pose of the vehicle; and
determining a calibration factor for a sensor of the sensor array based on a comparison of the observed relative orientation between the sensor array and the vehicle to an expected relative orientation between the sensor array and the vehicle.

16. The system of claim 15, wherein determining the pose of the vehicle or the pose of the sensor array comprises:
determining a location of each reference marker of the two or more reference markers on the vehicle or the two or more reference markers on the sensor array, respectively, within an image of the vehicle or the sensor array; and
determining an orientation relative to the vehicle or the sensor array of a camera that captured the image based on a comparison of the location of each reference marker on the vehicle or the sensor array, respectively, in the image to an expected location of a corresponding reference marker specified by the model of the vehicle or the sensor array, respectively.

17. The system of claim 15, wherein determining the pose of the vehicle or the pose of the sensor array comprises:
determining a location of each reference marker of the two or more reference markers on the vehicle or the two or more reference markers on the sensor array, respectively, within a plurality of images of the vehicle or the sensor array, respectively;
computing an observed location of each reference marker on the vehicle or the sensor array based on the location of the reference marker within each image of the plurality of images; and
comparing the observed location of each reference marker to an expected location of a corresponding reference marker specified by the model of the vehicle and the sensor array.

18. One or more computer-readable non-transitory storage media embodying software that is operable when executed to cause one or more processors to perform operations comprising:
detecting two or more reference markers on a vehicle and two or more reference markers on a sensor array attached to the vehicle;
determining a pose of the vehicle based on the detected reference markers on the vehicle and a model of the vehicle comprising expected locations of the detected reference markers on the vehicle;
determining a pose of the sensor array based on the detected reference markers on the sensor array and a model of the sensor array comprising expected locations of the detected reference markers on the sensor array;
computing an observed relative orientation between the sensor array and the vehicle based on a comparison of the determined pose of the sensor array and the determined pose of the vehicle; and
determining a calibration factor for a sensor of the sensor array based on a comparison of the observed relative orientation between the sensor array and the vehicle to an expected relative orientation between the sensor array and the vehicle.

19. The media of claim 18, wherein determining the pose of the vehicle or the pose of the sensor array comprises:
determining a location of each reference marker of the two or more reference markers on the vehicle or the two or more reference markers on the sensor array, respectively, within an image of the vehicle or the sensor array; and
determining an orientation relative to the vehicle or the sensor array of a camera that captured the image based on a comparison of the location of each reference marker on the vehicle or the sensor array, respectively, in the image to an expected location of a corresponding reference marker specified by the model of the vehicle or the sensor array, respectively.

20. The media of claim 18, wherein determining the pose of the vehicle or the pose of the sensor array comprises:

determining a location of each reference marker of the two or more reference markers on the vehicle or the two or more reference markers on the sensor array, respectively, within a plurality of images of the vehicle or the sensor array, respectively;

computing an observed location of each reference marker on the vehicle or the sensor array based on the location of the reference marker within each image of the plurality of images; and comparing the observed location of each reference marker to an expected location of a corresponding reference marker specified by the model of the vehicle and the sensor array.

\* \* \* \* \*